(12) United States Patent
Barido et al.

(10) Patent No.: US 9,404,699 B1
(45) Date of Patent: *Aug. 2, 2016

(54) TRIGGER LOCK

(71) Applicants: Matthew Thomas Barido, San Antonio, TX (US); Matthew Aaron Lucero, San Antonio, TX (US); James Skylar Gerrond, San Antonio, TX (US)

(72) Inventors: Matthew Thomas Barido, San Antonio, TX (US); Matthew Aaron Lucero, San Antonio, TX (US); James Skylar Gerrond, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,105

(22) Filed: Mar. 17, 2014

Related U.S. Application Data

(63) Continuation-in-part of application No. 14/217,033, filed on Mar. 17, 2014, now Pat. No. 9,097,479.

(60) Provisional application No. 61/794,682, filed on Mar. 15, 2013.

(51) Int. Cl.
*F41A 17/54* (2006.01)

(52) U.S. Cl.
CPC ...................................... *F41A 17/54* (2013.01)

(58) Field of Classification Search
USPC .............................................. 42/70.06, 70.07
See application file for complete search history.

(56) References Cited

U.S. PATENT DOCUMENTS

| | | | |
|---|---|---|---|
| 3,269,046 A | 8/1966 | Schaefer | |
| 4,422,254 A | 12/1983 | McQueen | |
| 4,467,545 A | 8/1984 | Shaw, Jr. | |
| 5,012,605 A | 5/1991 | Nishioka | |
| 5,024,017 A | 6/1991 | Nishioka | |
| 5,062,232 A | 11/1991 | Eppler | |
| 5,075,994 A | 12/1991 | Nishioka | |
| 5,502,915 A | 4/1996 | Mendelsohn et al. | |
| 5,603,179 A | 2/1997 | Adams | |
| 5,937,557 A | 8/1999 | Bowker et al. | |
| 6,098,330 A | 8/2000 | Schmitt et al. | |
| 6,154,995 A | 12/2000 | Lenoir et al. | |
| 6,286,240 B1 | 9/2001 | Collins | |
| 6,293,039 B1 | 9/2001 | Fuchs | |
| 6,343,140 B1 | 1/2002 | Brooks | |
| 6,389,726 B1 | 5/2002 | Bentley | |
| 6,474,011 B1 | 11/2002 | Sato | |
| 6,499,243 B1 | 12/2002 | Herzog | |
| 7,584,566 B2 | 9/2009 | Victor et al. | |
| 7,730,750 B2 | 6/2010 | Victor | |
| 8,037,632 B2 | 10/2011 | Pikielny | |
| 8,186,088 B2 | 5/2012 | Victor et al. | |
| 9,097,479 B1 * | 8/2015 | Barido et al. | ........... F41A 17/54 |
| 2002/0095845 A1 * | 7/2002 | Sapia | ........................... 42/70.07 |
| 2008/0060246 A1 * | 3/2008 | Rozovsky | ................... 42/70.01 |
| 2008/0134556 A1 | 6/2008 | Remelin | |
| 2011/0047849 A1 | 3/2011 | Brenner | |
| 2012/0011756 A1 | 1/2012 | Albano Do Amarante et al. | |
| 2012/0137559 A1 | 6/2012 | Burns, III | |
| 2013/0180147 A1 * | 7/2013 | Lupher et al. | ................ 42/69.01 |

* cited by examiner

Primary Examiner — Bret Hayes

(57) ABSTRACT

A trigger lock that can be mounted to the trigger guard of a handheld firearm. The trigger lock has a cover assembly displaceably mounted to a lock housing assembly. The cover assembly is displaceable between a locked position and an unlocked position. A mount adapter is removeably mated to a housing body within the lock housing assembly. The removeable mount adapter has a mount surface shaped to correspond with the outer surface of the trigger guard, allowing the trigger lock to be used on various makes and models of firearms. The trigger lock includes a locking means which in one embodiment has a lock rotor with a caroming surface to displace one or more locking members into the cover assembly.

1 Claim, 39 Drawing Sheets

NOTE: SENSE OUPUT, POWER, AND GROUND ARE PROVIDED
BY MAGNETIC WIRE (34 GA) FROM MOTOR CONTROLLER.
SENSE  IS CONNECTED TO P1.3 OF U1
MOTOR CONTROLLER. LED IS CONNECTED TO P1.4 OF U1 TO
TURN OFF LED WHEN NOT IN USE.

ROTOR REFLEX SENSOR

TRIGGER LOCK

CROSS REFERENCES TO RELATED APPLICATIONS

This is a continuation-in-part application that claims the benefit of and priority to U.S. application Ser. No. 14/217,033, filed on Mar. 17, 2014, which claims the benefit of and priority to U.S. provisional patent Application Ser. No. 61/794,682, filed Mar. 15, 2013, entitled "Trigger Lock." Each of these applications is incorporated herein by reference.

STATEMENT REGARDING FEDERALLY SPONSORED RESEARCH OR DEVELOPMENT

Not applicable.

BACKGROUND OF THE INVENTION

1. Technical Field

The present invention generally concerns safety devices for handheld firearms. Specifically, it concerns a trigger lock which mounts to the trigger guard of a handheld firearm and restricts access to the firearm trigger.

2. Description of the Related Art

Firearm safety devices prevent unwanted or accidental discharge of firearms. Some devices are built into the firearm by the manufacturer while others are an aftermarket item installed on the firearm. If a safety device falls within the latter category, it must account for design variations present between firearms in the marketplace and should be able to provide safety regardless of the firearm design.

Trigger locks are one type of aftermarket safety device. Traditional trigger locks use a keyed lock and the trigger cannot be pulled unless an authorized person—i.e., the person with a key—inserts the key into a keyhole and unlocks the device.

Operating keyed trigger locks is often a cumbersome process that is impractical in emergency situations. For example, locating the key, inserting it into the keyhole, and operating the lock in the dark—when a suspected intruder has entered a person's home and the user is in distress—may not be possible given the circumstances. Therefore, a need exists for a trigger lock that can be quickly deactivated yet still provide safety against unauthorized use.

BRIEF SUMMARY OF THE INVENTION

The present invention is a trigger lock device which overcomes the drawbacks associated with traditional keyed trigger locks. The device has a lock housing assembly mated to a mount adapter and installed on the trigger guard of a firearm. The mount adapter has a mount surface that corresponds with and mates against an outer surface of the trigger guard. Preferably, the mount adapter is removeably mated to the lock housing assembly, allowing interchangeability of the mount adapter with other mount adapters, each of which has a mount surface designed for a particular make and model of firearm.

A cover assembly is displaceably mounted to the lock housing assembly. The cover assembly has a slide cover with sidemembers on either side of the trigger guard. Each sidemember has an inner surface that faces the lock housing. The cover assembly is displaceable between an unlocked position—i.e., where the trigger is accessible—and a locked position—i.e., where the sidemembers restrict access to the trigger. In the locked position, a locking means for preventing displacement of the cover assembly from the locked position toward the unlocked position.

An input means for receiving a deactivation parameter is incorporated into the trigger lock. The particular input means depends upon the nature of the deactivation parameter, which is a design choice selected according to the particular needs for securing the firearm. The preferred deactivation parameter is a fingerprint from a person authorized to use the weapon, making the preferred input means a fingerprint sensor.

The input means is in communication with a host controller subsystem that controls deactivation of the locking means. The host controller subsystem includes a microprocessor that issues commands based upon whether the proper deactivation parameter is present. In one embodiment, for example, the microprocessor commands the locking means to deactivate when a fingerprint presented on the fingerprint sensor matches that of an authorized person. Deactivation of the locking means allows the cover assembly to be displaced toward the unlocked position.

In one embodiment the locking means includes two ball bearing locking members extending between the lock housing and the slide cover. When the cover assembly is in the locked position each ball bearing is partially within the lock housing assembly and partially within a recess on the inner surface of one of the sidemembers. When a proper deactivation parameter is presented, a motor contained within the lock housing is activated to turn a lock rotor. When rotated to the proper position, the lock rotor has voids that receive a portion of the ball bearings allowing each bearing to exit its respective recess which, in turn, allows the cover assembly to be displaced to the unlocked position.

A coil spring disposed on a guide rod or other means for biasing the cover assembly from the locked position toward the unlocked position is between the cover assembly and the lock housing assembly. Displacement of the cover assembly forces each ball bearing into its corresponding void on the lock rotor. In this regard, the recesses on the inner surfaces of the sidemembers are shaped to urge the ball bearings into the respective voids while the cover assembly displaces from the locked position toward the unlocked position.

DETAILED DESCRIPTION OF THE INVENTION

Figure 1:
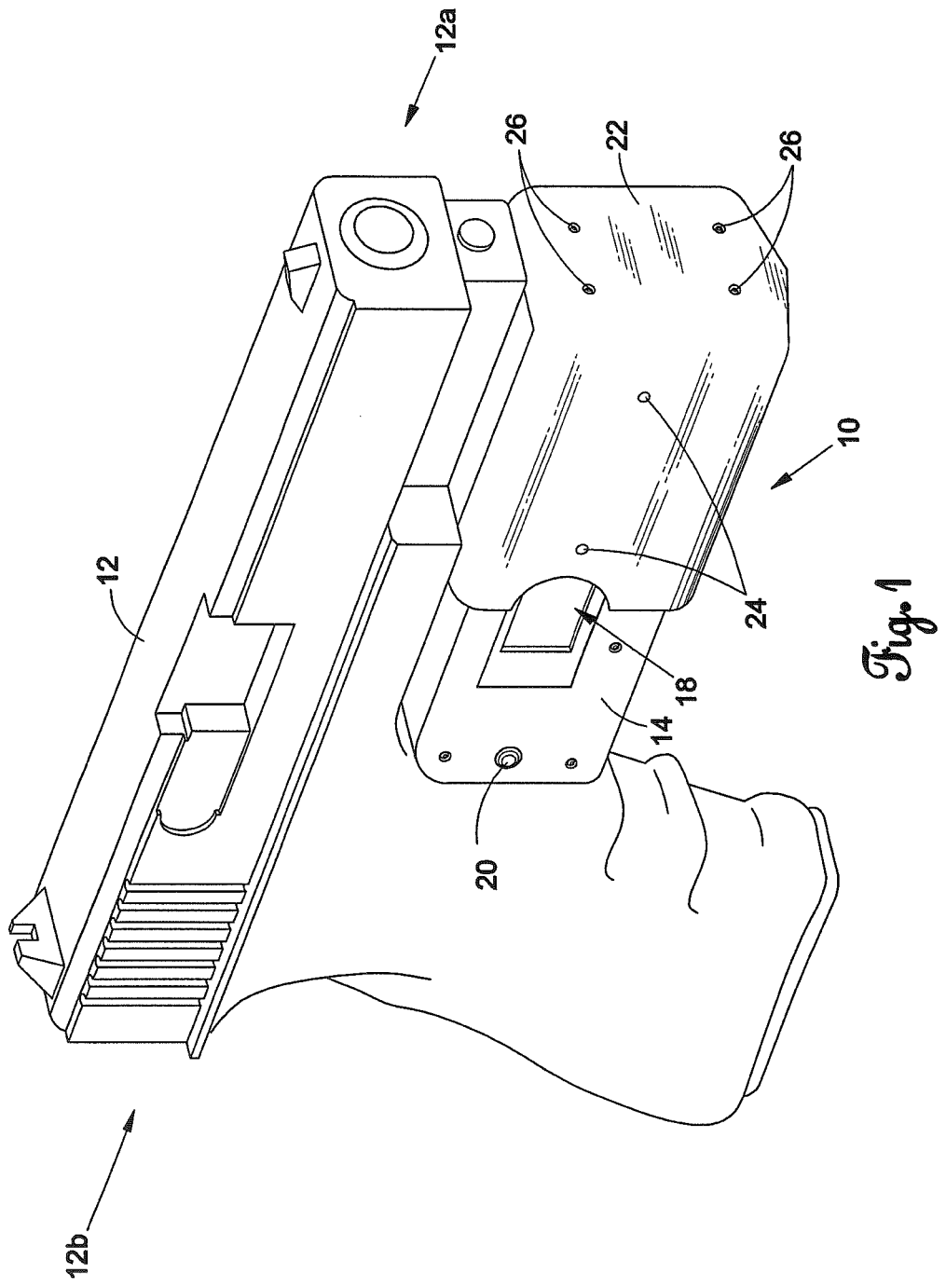
FIG. 1 illustrates a top perspective view of the preferred embodiment of the present invention taken from a front end, with the cover assembly in a locked position.

Referring to FIG. 1, a trigger lock 10 is shown installed on a firearm 12. The firearm 12 has a muzzle end 12a and a grip end 12b opposite the muzzle end 12a. References herein to the "front" or "forward" end of a component refer to an end of the component facing generally toward the muzzle end 12a whereas references to the "rear" end of a component refer to an end of the component facing generally toward the grip end 12b.

The trigger lock 10 includes a cover assembly 14. The cover assembly is shown in a locked position in FIG. 1. The cover assembly 14 includes a control switch 20 that is accessible both when the cover assembly 14 is in the locked and when the cover assembly 14 is in the unlocked position.

The trigger lock 10 also includes an input means for receiving a deactivation parameter. The particular input means depends on the deactivation parameter selected. In this embodiment, the input means is a fingerprint reader subsystem 18 within the cover assembly 14 and the deactivation parameter is an authorized person's fingerprint.

The fingerprint reader subsystem 18 may utilize any fingerprint sensor known in the art. For example, an optical sensor, a thermal sensor, a pressure sensor, a radio-frequency (RF) sensor, or an ultrasonic sensor may be suitable. It may be a static sensor where a user places his/her finger motionless on the surface of the sensor or a swipe sensor where the user swipes or drags his/her finger across it. In this embodiment, the fingerprint reader subsystem 18 utilizes a static sensor such as, for example, one having model number FPC1011F3 offered by the Fingerprint Cards AB Company.

The particular components within the cover assembly 14 will vary according to the input means. Other input means for receiving the deactivation parameter include:
 (1) Input means may be other biometric sensors such as a retinal sensing device or a voice recognition sensor with the deactivation parameter being the presence of the applicable biometric from an authorized person;
 (2) Input means may be a keypad with the deactivation parameter being a combination of keystrokes programmed into the trigger lock 10;
 (3) Input means may be a wireless receiver with the deactivation parameter being a deactivation command sent from a wireless transmitter;
 (4) Input means may be a radio frequency identification (RFID) reader having a radio transceiver, with the deactivation parameter being a transponder having an RFID tag; and,
 (5) Input means may be a geo-location sensor that uses a global positioning system (GPS) to determine the location of the trigger lock 10 installed on the firearm 12, with the deactivation parameter being a geo-fence defined by GPS coordinates programmed into the trigger lock 10.

The cover assembly 14 is partially within a sheath 22 that has lenses 24. The lenses 24 give a visual indicator of the internal operations for the trigger lock 10. The sheath 22 is secured to internal components of the trigger lock 10 with one or more threaded fasteners 26 or in some other manner.

Figure 2:
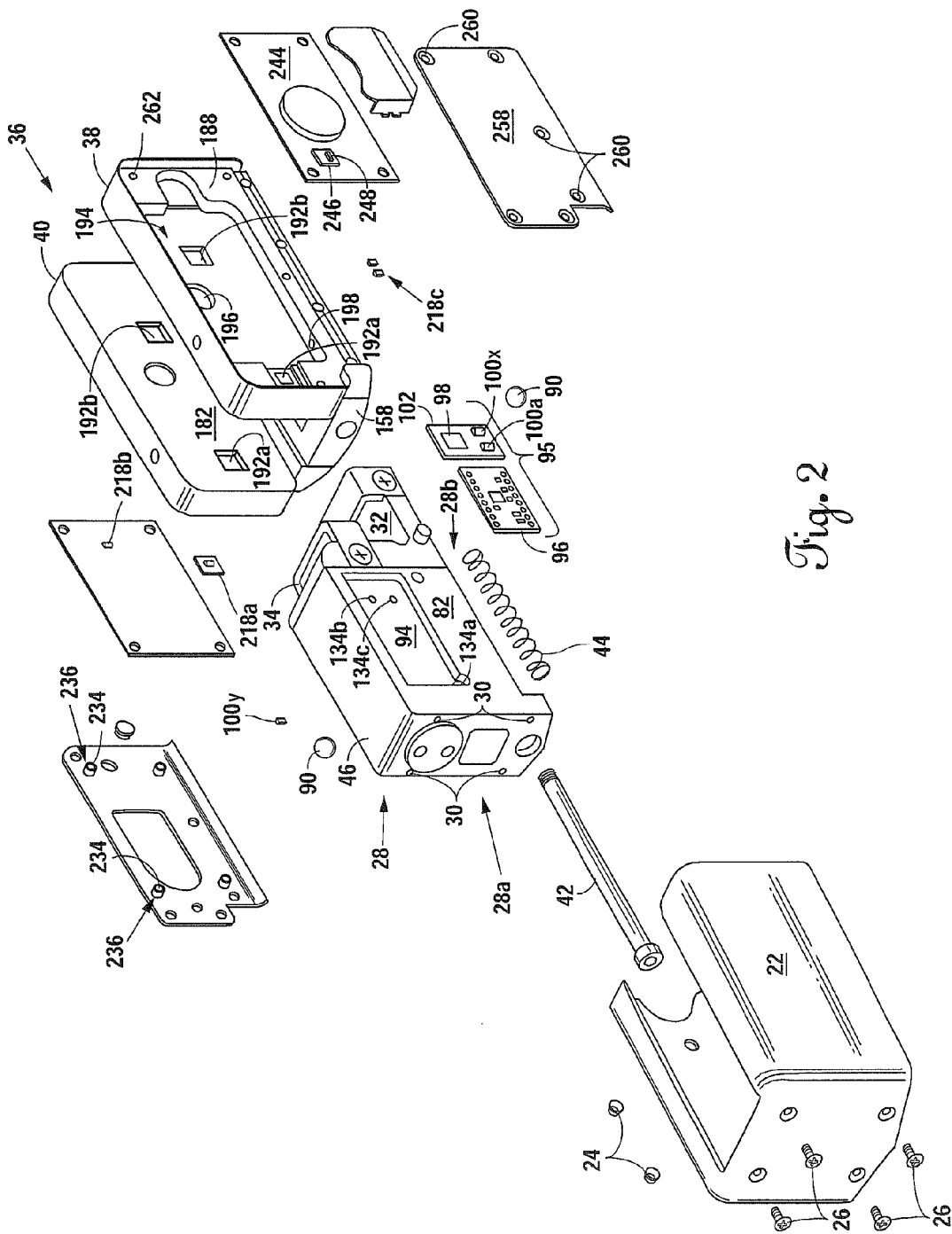
FIG. 2 is a partially exploded top perspective view of various components within the preferred embodiment, showing the front end of the components.

FIG. 2 shows various internal components of the trigger lock 10 and includes a lock housing assembly 28. The lock housing assembly 28 has a forward end 28a and a rear end 28b. In this embodiment, the threaded fasteners 26 extend into receptacles 30 on the forward end 28a of the lock housing assembly 28. At the rear end 28b of the lock housing assembly 28, is a mount adapter assembly 32 mated to the lock housing assembly 28.

Various components within the cover assembly 14 are also shown in FIG. 2, including a slide cover 36. The slide cover 36 has a first sidemember 38 and a second sidemember 40 extending vertically from a bridge 158 that extends between the sidemembers 38, 40. The slide cover 36 is displaceably mounted to the lock housing assembly 28 and the mount adapter assembly 32. In this embodiment, a guide rod 42 extends through part of the lock housing assembly 28 and through the bridge 158 of the slide cover 36.

A biasing means for biasing the cover assembly 14 from the locked position toward the unlocked position is between the cover assembly 14 and the lock housing assembly 28. In this embodiment, a spring 44 disposed on the guide rod 42 between the lock housing assembly 28 and the bridge 158 acts as the biasing means; however, other biasing means are contemplated as discussed below.

Figure 3:
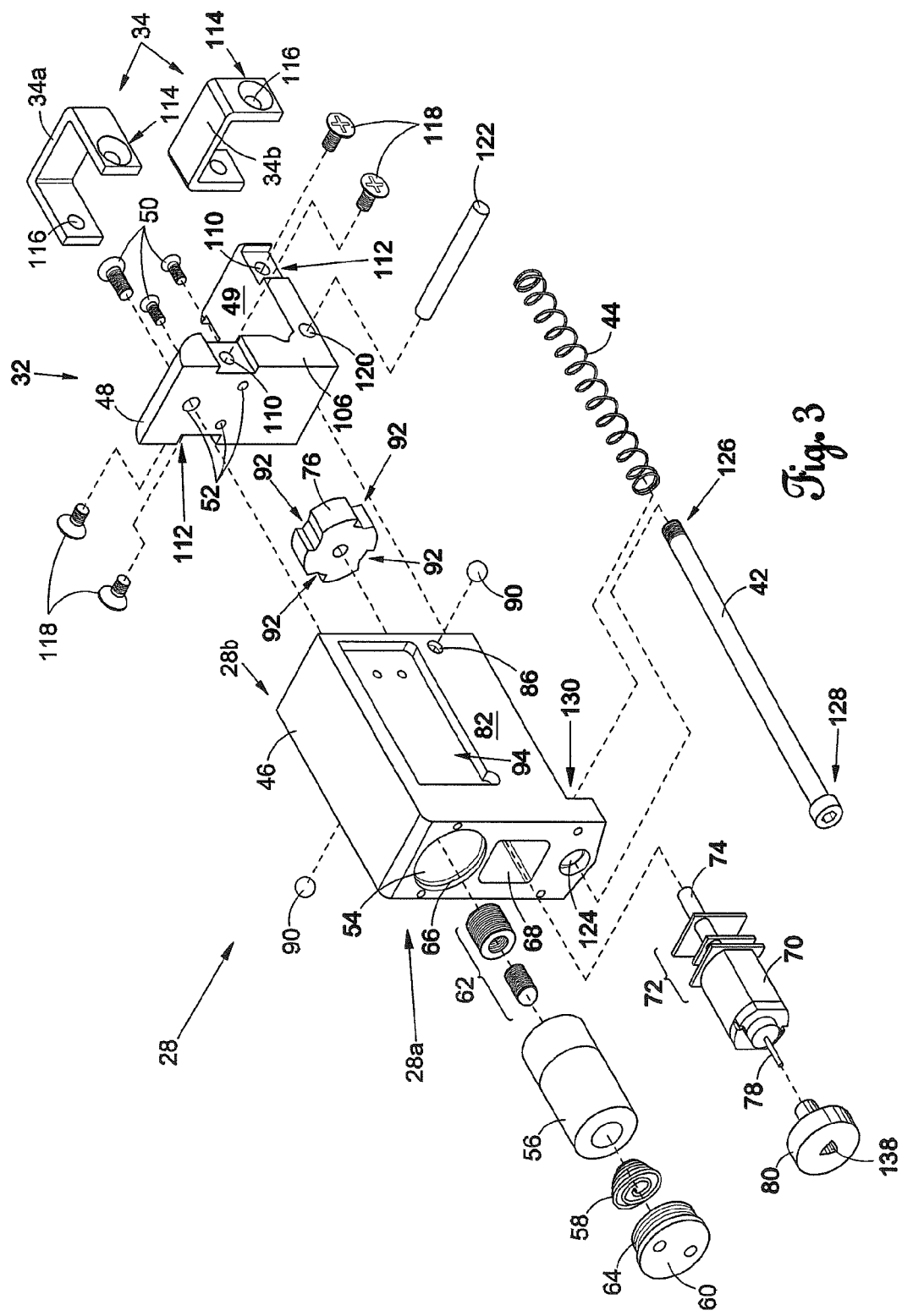
FIG. 3 an exploded top perspective view of the lock housing assembly, a mount adapter assembly, and a guide rod with a spring.

Referring to FIG. 3, the preferred lock housing assembly 28 and mount adapter assembly 32 are shown in an exploded view. The lock housing assembly 28 includes a housing body 46 that is separated from a mount adapter 48 within the mount adapter assembly 32. In this embodiment, the mount adapter 48 is removeably mated to the housing body 46 with threaded fasteners 50 through holes 52; however, the mount adapter 48 may be removeably mated to the housing body 46 in some other manner. As a further alternative, housing body 46 and mount adapter 48 may be permanently mated.

A battery compartment 54 extends from the forward end 28a into the interior of the housing body 46 for placement of a battery 56. The battery 56 is electrically connected to a negative terminal 58 on a cap 60 and to a positive terminal 62 within the battery compartment 54. Preferably, the cap 60 is removable from the housing body 46 for replacement of the battery 56. For example, the cap 60 may have external threads 64 to engage with internal threads 66 within the battery compartment 54. Alternatively, the battery 56 may be rechargeable so as to avoid removal of the cap 60 altogether.

A motor compartment 68 also extends from the forward end 28a into the interior of the housing body 46. A motor 70, gearbox 72, rear shaft 78, and keyed rotor 80 occupy the motor compartment 68. The motor 70 has an output shaft (not shown) extending into the gearbox 72 at one end. A drive shaft 74 extends from the gearbox 72 toward the rear end 28a of the lock housing assembly 28 and a lock rotor 76 is mounted on the drive shaft 74 within the housing body 46. On the other end of the motor 70, the keyed rotor 80 is mounted on the rear shaft 78. The rear shaft 78 and the output shaft (not shown) of the motor 70 may be a single extended drive shaft extending through both ends of the motor 70 or they may be operatively coupled to each other so that rotation of the rear shaft 78 causes rotation of the output shaft. For example, a "100:1 Micro Metal Gearmotor with Extended Shaft," Model No. 2204, offered by the Pololu Corporation has been found suitable.

Figure 4:
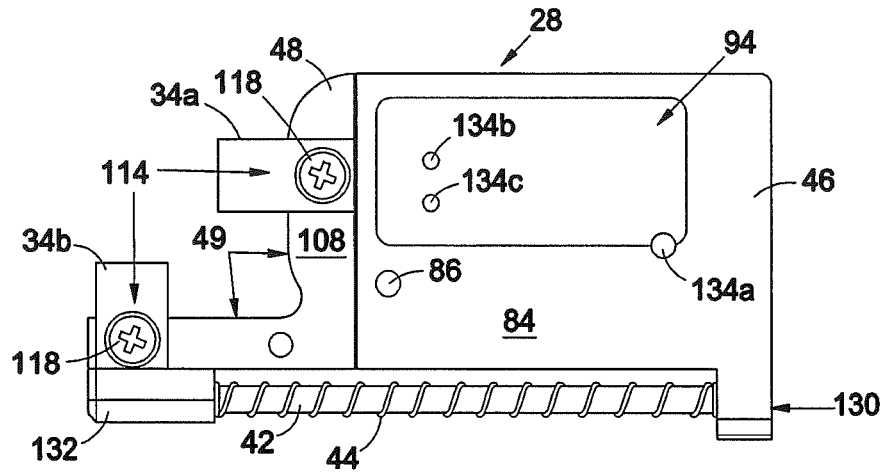
FIG. 4 is a side elevation view of the mount adapter assembly mated to the lock housing assembly, with the guide rod extending between the mount adapter assembly and the lock housing assembly.

A first side of the housing body 46 is shown in FIG. 3 while a second side is shown in FIG. 4. The first and second sides of the housing body 46 each have an exterior surface 82, 84. In this embodiment, the exterior surface 82, 84 are shaped and configured identical to each other, with each exterior surface 82, 84 defining an indention 94.

Electrical components are secured within the indention 94 using an adhesive (e.g., epoxy) or in some other manner. Referring to FIG. 2, for example, a motor controller subsystem 95 including a motor driver 96, a motor microcontroller 98, and an optical transceiver 100a is secured within the indention 194 on the exterior surface 82 of the first side of the housing body 46.

Optical transceivers for communication through the housing body 46 are secured within the indention 94 on both sides of the housing body 46. Optical transceiver 100x is on the exterior surface 82 of the first side and optical transceiver 100y is on the exterior surface 84 of the second side. The optical transceivers 100x, 100y are electrically connected through the housing body 46 (not shown). As will be seen, these optical transceivers 100x, 100y are positioned on the housing body 46 to communicate with optical transceivers on the cover assembly 14 in this embodiment. Alternatively, communication through the housing body 46 may be through a fiber optic or an infrared light pipe. For convenience, the optical transceivers 100a and 100x on the first side of the housing body 46 are shown on a circuit board 102 along with the motor microcontroller 98.

A reflex sensor bearing model number GP2S60 manufactured by Sharp Electronics Corporation® has been found to be suitable to act as the optical transceivers 100a, 100x, 100y. In this application, the reflex sensor is used for optical communication because the emitter and detector of the reflex sensor face the emitter and detector of a corresponding reflex sensor on the cover assembly 14, as discussed below.

Referring back to FIG. 3, a guide hole 86 extends from the exterior surface 82 of the housing body 46 into a rotor compartment 88 (see FIG. 8) within the housing body 46 that is occupied by the lock rotor 76. A similar guide hole 86 extends from the exterior surface 84 of the second side (shown in FIG. 4). Each guide hole 86 allows displacement of a locking member within it. In this embodiment, the locking member is a ball bearing 90. Alternative locking members may include, for example, a cylinder, a prolate spheroid, or a cylinder with rounded ends (not shown). Each locking member is displaceable within its respective guide hole 86 at least partially into one of several voids 92 on the lock rotor 76. While the illustrated embodiment has the guide hole 86 and accompanying ball bearing 90 on each side of the housing body 46, only a single guide hole and ball bearing (not shown) may be present.

A support hole 124 is within a first protrusion 130 extending from the housing body 46 at the forward end 28a. The support hole 124 is shaped to receive the guide rod 42 with minimal clearance. The guide rod 42 has external threads 126 along one end and a head 128 at its other end. The guide rod 42 extends through the support hole 124 and the coil spring 44 toward the mount adapter assembly 32.

Within the mount adapter assembly 32, the mount adapter 48 includes a mount surface 49, a first side surface 106 (shown in FIG. 3), and a second side surface 108 (shown in FIG. 4). Although there may be small breaks, the mount surface 49 is a substantially continuous surface extending between the first side surface 106 (shown in FIG. 3) and the second side surface 108 (shown in FIG. 4) of the mount adapter 48. One or more clamps 34 extend over the mount surface 49. The first and second side surfaces 106, 108 are configured to receive an upper clamp 34a and a lower clamp 34b. Each of the side surfaces 106, 108 has one or more receptacles 110 within an indention 112, with one receptacle per indention 112. Each indention 112 is shaped to snuggly receive a bored area 114 of clamps 34. Each bored area 114 has a hole 116 aligned with one of the receptacles 110. A threaded fastener 118 extends through each hole 116 into its corresponding receptacle.

Also shown in FIG. 3, a pinhole 120 extends between the side surfaces 106, 108 of the mount adapter 48. A guide pin 122 occupies the pinhole 120 and extends beyond the side surfaces 106, 108 of the mount adapter 48.

Referring to FIG. 4, the mount adapter 48 is mated to the housing body 46. The guide rod 42 extends between the first protrusion 130 and is threaded into a second protrusion 132 extending from the mount adapter 48. The upper clamp 34a and lower clamp 34b are attached to the mount adapter 48 with the threaded fastener 118 through the corresponding bored area 114.

Various apertures are on the exterior surface 84 of the second side of the housing body 46, as well as on the exterior surface 82 of the first side of the housing body 46 (shown FIG. 3). These include a motor aperture 134a, a power aperture 134b, and a communication aperture 134c.

The apertures 134 allow electrical connection and communication through the housing body 46. The motor aperture 134a allows electrical connection between the motor driver 96 (shown in FIG. 2) on the exterior surface 82 and the motor 70 within the housing body 46. The power aperture 134b allows electrical connection between the motor driver 96 and the battery 56 within the housing body 46. The communication aperture 134c extends through the housing body 46 and allows communication between the first and second sides of the housing body 46.

Figure 5:
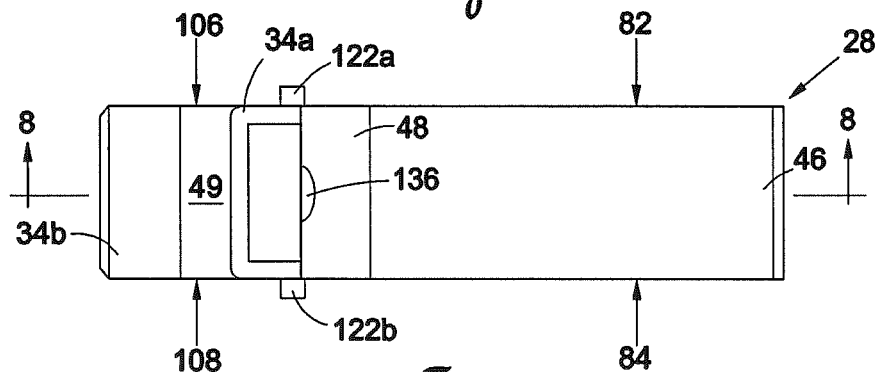
FIG. 5 is a top plan view of the mount adapter assembly mated to the lock housing assembly.

Referring to FIG. 5, the mount adapter 48 defines a countersink 136. Each clamp 34a, 34b extends over the mount surface 49. The bored area 114 of each clamp 34 is within its respective indention 112 and, therefore, the clamp 34 does not extend beyond the first and second side surfaces 106, 108. In contrast, portions 122a, 122b of the guide pin 122 extend beyond the first and second side surfaces 106, 108. Further, the exterior surface 82 on the first side of the housing body 46 is flush with the first side surface 106 on the mount adapter 48 and the exterior surface 84 on the second side of the housing body 46 is flush with the second side surface 108 on the mount adapter 48, creating a generally planar overall exterior surface.

Figures 6, 7:
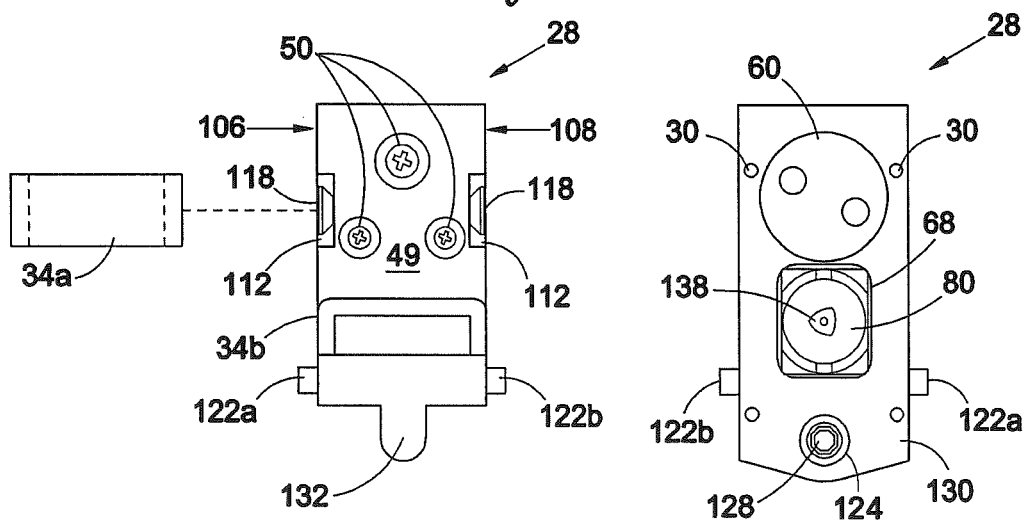
FIG. 6 is a rear end elevation view of the mount adapter assembly mated to the lock housing assembly.
FIG. 7 is a front end elevation view of the mount adapter assembly mated to the lock housing assembly.

FIG. 6 shows the mount adapter assembly 32 with the upper clamp 34a removed so that the threaded fasteners 50 through the holes 52 in the mount surface 49 are visible. The indention 112 on the first and second side surfaces 106, 108, and each threaded fastener 118 therein, are visible, as are the portions 122a, 122b of the guide pin 122 and the second protrusion 132.

Referring to FIG. 7, the head 128 of guide rod 42 is within the support hole 124 in the first protrusion 130. The portions 122a, 122b of the guide pin and the receptacles 30 for attaching the sheath 22 are also shown, although the sheath 22 is not. The keyed rotor 80 occupies the motor compartment 68, revealing a keyhole 138. To manually unlock this embodiment a key (not shown) is inserted into the keyhole 138 and torque applied to the key rotates the keyed rotor 80. Rotating the keyed rotor 80 causes the rear shaft 78 of the motor 70 to rotate, which causes the output shaft (not shown) of the motor 70 to rotate within the gearbox 72. Rotation of the output shaft within the gearbox 72 eventually causes the drive shaft 74 to rotate which, in turn, rotates the lock rotor 76 and ultimately unlocks the device.

Figure 8:
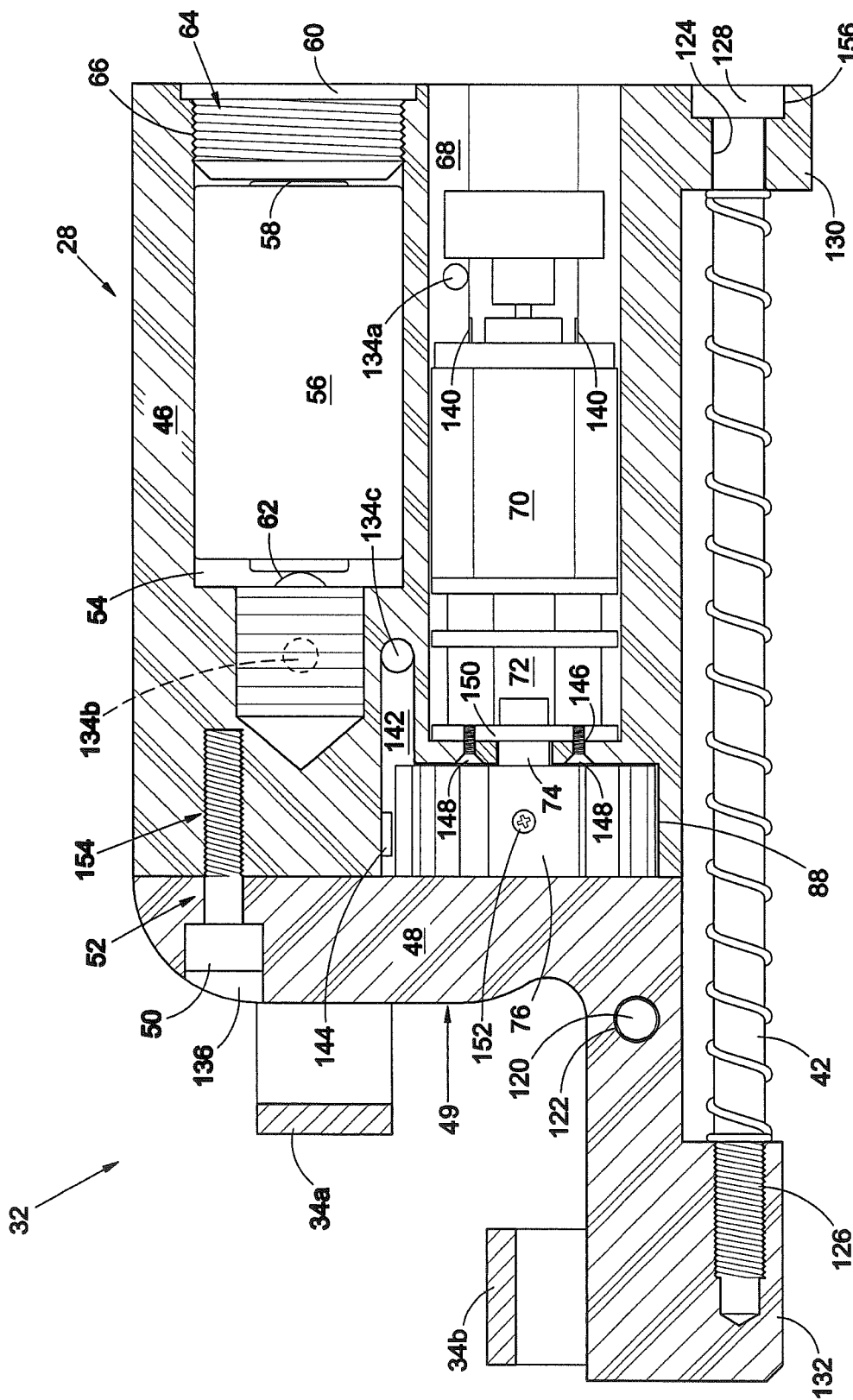
FIG. 8 is a cross section side view of a housing body and the mount adapter assembly taken along longitudinal cross-section line 8-8 in FIG. 5, while components within the housing body are not in cross section.

Referring to FIG. 8, the external threads 64 on the cap 60 are engaged with the internal threads 66 within the battery compartment 54. The battery 56 is electrically connected with the negative terminal 58 and the positive terminal 62. Behind the positive terminal 62 is the power aperture 134b while the motor aperture 134a is within the motor compartment 68 near electrical contacts 140 of the motor 70.

The housing body 46 defines a sensor compartment 142 extending away from the communication aperture 134c toward the mount adapter 48. Preferably, the sensor compartment 142 opens into the rotor compartment 88. A position sensor 144 located in the sensor compartment 142 monitors the position of the lock rotor 76. One or more wires (not shown) routed from the position sensor 144 to the communication aperture 134c communicate the position of the lock rotor 76 to the motor controller subsystem 95 (shown in FIG. 2), as discussed further infra.

FIG. 8 also demonstrates how the motor 70 may be secured within the housing body 46. The motor 70 occupies the motor compartment 68 with the drive shaft 74 extending from the gearbox 72 into the lock rotor 76 in the rotor compartment 88. Motor mount holes 146 extend between the compartments 68, 88, and, threaded fasteners 148 inserted through the motor mount holes 146 are threaded into a plate 150 on the gearbox 72. The threaded fasteners 148 are inserted into the motor mount holes 146 prior to the lock rotor 76 being installed on the drive shaft 74.

A set screw 152 secures the lock rotor 76 to the drive shaft 74. The set screw 152 is inserted through the guide hole 86 (shown in FIG. 4) and tightened prior to inserting the ball bearing 90.

Other items are also shown in FIG. 8. One of the holes 52 through the mount surface 49 and accompanying countersink 136 are shown with one of the fasteners 50 threaded into a receptacle 154 in the housing body 46. The upper and lower clamps 34a, 34b are also shown in cross section while the guide pin 122 in the pinhole 120 is not in cross section. Finally, the guide rod 42 is shown extending through the support hole 124 in the first protrusion 130, with its head 128 within a countersink 156. The external threads 126 of the guide rod 42 are engaged with internal threads within the second protrusion 132.

The various compartments within the housing body 46 may be shaped and arranged differently, or may not be separated from each other, in alternative embodiments. It should also be noted that the preferred housing body 46 and mount adapter 48 are machined or otherwise manufactured through subtractive processes using 6061-T6 grade aluminum alloy stock but could be made from some other a high-strength, lightweight material. Further, these items may be manufactured through alternative manufacturing processes such as, for example, die-casting, injection molding, or additive processes such as three-dimensional printing. Each clamp 34 extending over the mount surface 49 is preferably made from high-strength, lightweight steel such as AISI 4130 grade steel, but again, other high-strength, lightweight materials may be used.

Figure 9:
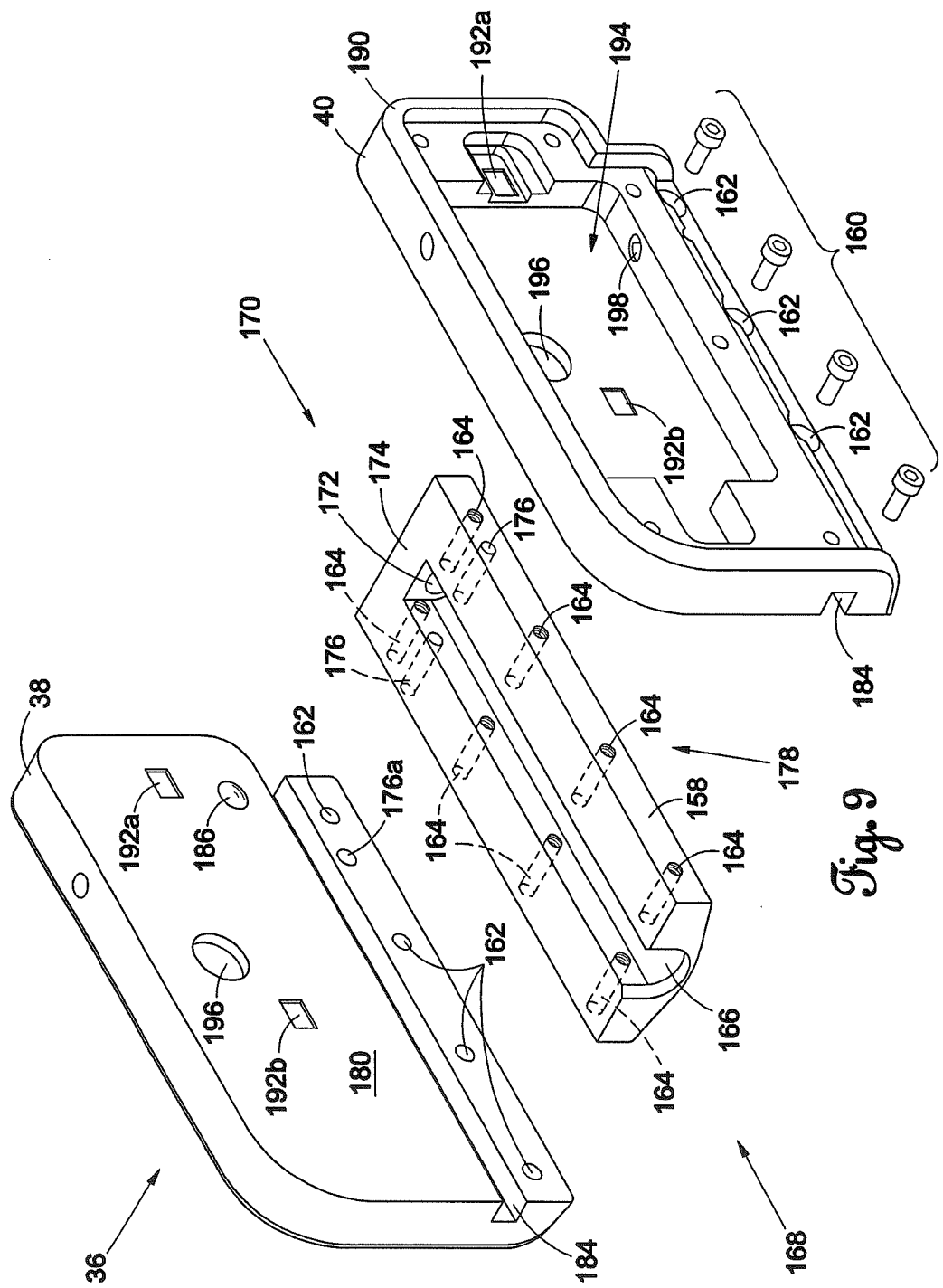
FIG. 9 is an exploded perspective view of a slide cover included within the cover assembly, showing the rear end of the slide cover.

Referring now to FIG. 9, the slide cover 36 is shown with the first and second sidemembers 38, 40 exploded from the bridge 158. In this embodiment, the bridge 158 is secured to the first and second sidemembers 38, 40 with one or more bolts 160 that extend through holes 162 in the sidemembers 38, 40 and into corresponding threaded receptacles 164 in the bridge 158. Alternatively the bridge 158 and sidemembers 38, 40 may be secured to each other in some other manner or may be manufactured as an integral unit such as, for example, if the entire slide cover 36 were machined from a single piece of material, die-cast, or formed using three-dimensional printing or some other additive process (not shown). Regardless of the manufacturing method, the bridge 158 and the first and second sidemembers 38, 40 are preferably made of a high-strength, lightweight material such as, for example, 6061-T6 grade aluminum alloy.

A channel 166 within the bridge 158 extends in a longitudinal direction between a rear end 168 and a front end 170 of the bridge 158. The channel 166 is sized to receive the portion of the guide rod 42 and the spring 44 between the first and second protrusions 130, 132 (shown in FIG. 8). In this embodiment, the channel 166 has in internal profile that matches the outer profile of the second protrusion 132 (shown in FIG. 6) so that the protrusion 132 fits within the channel 166 with minimal clearance. The channel 166 extends through the rear end 168 of the bridge 158 while at the front end 170 it terminates into a hole 172 through a portion 174 of the bridge 158 which traverses the channel 166.

A power cord aperture 176 extends through the bridge 158. The power cord aperture 176 aligns with a corresponding aperture 176a on the first sidemember 38 and a corresponding aperture 176b (shown in FIG. 14) on the second sidemember 40. The power cord aperture 176 and the corresponding apertures 176a, 176b allows electrical connection between the first and second sidemembers 38, 40 through the bridge 158. In alternative embodiments, electrical connection may be routed through a channel (not shown) in a bottom surface 178 of the bridge 158.

Each of the first and second sidemembers 38, 40 has an inner surface 180, 182, respectively. The inner surface 180 of the first sidemember 38 is visible in FIGS. 9 & 12 while the inner surface 182 of the second sidemember 40 is visible in FIGS. 13 & 14. In this embodiment, the inner surface 180 of the first sidemember 38 is shaped and configured identical to the inner surface 182 of the second sidemember 40. Accordingly, a discussion of elements on inner surface 180 of the first sidemember 38 applies equally to the inner surface 182 of the second sidemember 40 unless otherwise noted.

A guide channel 184 extends in a longitudinal direction along each of the inner surfaces 180, 182. Each guide channel 184 is sized to receive—preferably with minimal clearance—one of the portions 122a, 122b of the guide pin 122 which extend beyond the first and second side surfaces 106, 108 of the mount adapter 48 (shown in FIG. 6). Each guide channel 184 extends along its respective inner surface 180, 182 at or near where the bridge 158 is secured to the respective sidemembers 38, 40; however, the location of the guide channel 184 may vary depending on the location of the guide pin 122 in the mount adapter assembly 32. Further, only one of the sidemembers 38, 40 may have the guide channel 184 rather than both (not shown).

A recess 186 sized to receive part of the ball bearing 90 or other locking member is in the inner surface 180, 182 of both sidemembers 38, 40. Each recess 186 aligns with the corresponding guide hole 86 and ball bearing 90 in the lock housing assembly 28 when the cover assembly 14 is in the locked position. The preferred recess 186 is shaped as half of a prolate spheroid rather than half of a sphere. As such, the curvature of the recess 186 is less severe than half a sphere, providing for more efficient displacement of the ball bearing 90 into its respective guide hole 86 during the unlocking procedure.

The first and second sidemembers 38, 40 both have an exterior surface 188, 190. The exterior surface 190 of the second sidemember 40 can be seen in FIG. 9 while the exterior surface 188 of the first sidemember 38 can be seen in FIG. 2. In this embodiment, the exterior surface 188 of the first sidemember 38 is shaped and configured identical to the exterior surface 190 of the second sidemember 40. Accordingly, the following discussion of elements on exterior surface 188 of the first sidemember 38 applies equally to the exterior surface 190 of the second sidemember 40 unless otherwise noted.

Various optical pathways are between the inner surfaces 180, 182 and exterior surfaces 188, 190 of the sidemembers 38, 40. Each of the sidemembers 38, 40 has a first optical pathway 192a near the front end of the sidemembers 38, 40 and a second optical pathway 192b near the middle. The optical pathways 192 are any opening that allows light or other optical signals to travel between the inner surfaces 180, 182 and exterior surfaces 188, 190 of the sidemembers 38, 40. Alternatively, communication may be achieved through one or more wires (not shown) routed between the surfaces.

Each exterior surface 188, 190 defines an indention 194 and the optical pathways 192 are within the indention 194. The indention 194 accommodates electrical components secured to the exterior surfaces 188, 190 as further described below. Alternatively, the sidemembers 38, 40 may be configured such that one or more electrical components are secured in other locations on the slide cover 36 (e.g., within an indention defined by the inner surfaces (not shown)).

Also within the indention 194 is a mount aperture 196 and a power cord aperture 198. The power cord aperture 198 extends from within the indention 194, through the sidemember 38, 40, and into the power cord aperture 176 through the bridge 158, thus allowing electrical connection through the bridge 158.

Figure 10:
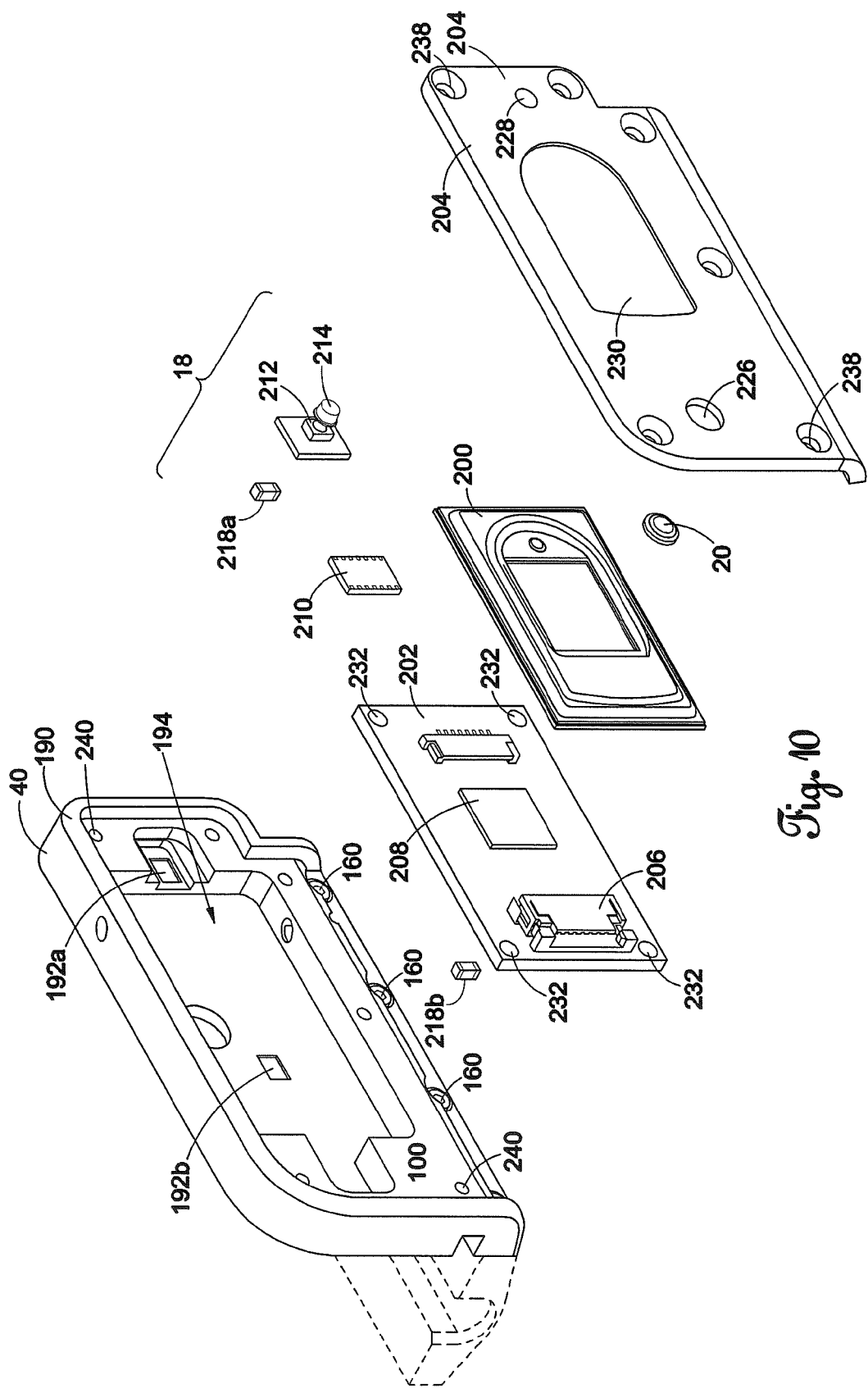
FIG. 10 is a perspective view of a second sidemember and exploded electrical components included within the cover assembly.

FIG. 10 shows components of the fingerprint reader subsystem 18 secured to the second sidemember 40 in this embodiment. The fingerprint reader subsystem 18 includes a fingerprint sensor 200, a biometric processor ASIC 208, a data storage component 210, a first optical transceiver 218a, and a second optical transceiver 218b. The date storage component 210 in this embodiment is a flash memory chip connected to the fingerprint processor ASIC 208 on a printed circuit board assembly (PCBA) 202. The biometric processor ASIC 208 compares fingerprints presented on the fingerprint sensor 200 with those of authorized people stored within the data storage component 210. The fingerprint sensor 200 is connected to the PCBA 202 through a connector 206 such as a Molex connector or any connector suitable for establishing and maintaining communication between the fingerprint sensor 200 and the PCBA 202.

Also secured to the second sidemember 40 in this embodiment is the control switch 20 and a light source 212 which are included within the host controller subsystem discussed infra. Light source 212 is a red/green/blue light emitting diode (LED) and is shown with an accompanying lens 214. Further, the control switch 20 is shown as a mechanical button though it could be a capacitive touch panel, toggle switch, or other switching device.

The optical transceivers 218a, 218b are positioned on the second sidemember 40 to correspond with the optical transceiver 100y (shown in FIG. 2) on the second side of the housing body 46. The first optical transceiver 218a is positioned over the first optical pathway 192a and the second optical transceiver 218b is positioned over the second optical pathway 192b, thus allowing communication with the optical transceiver 100y when the cover assembly 14 is in both the locked and unlocked positions. Again, reflex sensor model number GP2S60 manufactured by Sharp Electronics Corporation® has been found suitable for this application.

A faceplate 204 largely conceals the components within the indention 194 but has several apertures for access to the components beneath it. A first aperture 226 allows tactile access to the control switch 20. A second aperture 228 allows visible access to the lens 214 from the light source 212. Meanwhile, a third aperture 230 allows tactile access to the fingerprint sensor 200. Moreover, the faceplate 204 also conceals the bolts 160 that secure the second sidemember 40 to the bridge 158 in this embodiment.

During assembly, the PCBA 202 is secured to the faceplate 204 using fasteners or secured in some other manner. As shown, the PCBA 202 has one or more holes 232 which align with receptacles 234 within spacers 236 (shown in FIG. 2), and, threaded fasteners (not shown) are inserted through the holes 232 and threaded into the receptacles 234. The faceplate 204 is then secured to the second sidemember 40. For this step, the faceplate 204 has one or more holes 238 along its periphery that align with receptacles 240 in the indention 194 on the second sidemember 40, and, fasteners are inserted through the holes 238 and threaded into the receptacles 240.

Figure 11:
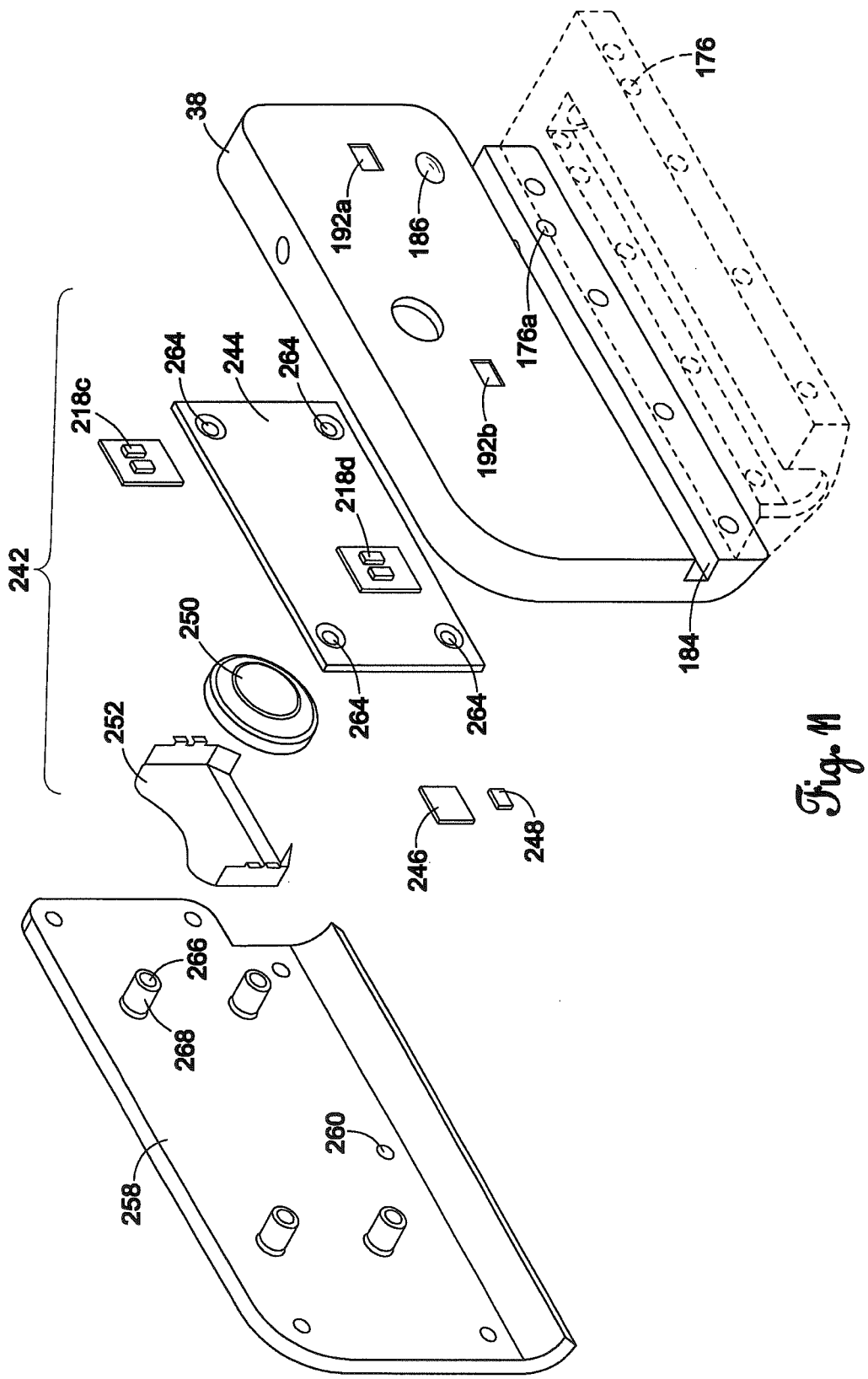
FIG. 11 is a perspective view of a first sidemember and exploded electrical components included within the cover assembly.

FIG. 11 shows electronic components of a host controller subsystem 242 secured to the first sidemember 38 in this embodiment. The host controller subsystem 242 includes a microcontroller 246, an oscillator 248, a first optical transceiver 218$c$, and a second optical transceiver 218$d$. These components are mounted to a single PCBA 244 in this embodiment. Additionally, the host controller subsystem 242 is powered by a battery 250 mounted to the PCBA 244 with a retaining device 252. The battery 250 is electrically connected to the light source 212 on the second sidemember 40 through the power cord aperture 176 and also powers the fingerprint reader subsystem 18. Alternatively, power may be supplied from the battery 56 within the lock housing assembly 28.

The optical transceivers 218$c$, 218$d$ are positioned on the first sidemember 38 to correspond with the optical transceiver 100$x$ (shown in FIG. 2) on the first side of the housing body 46. The first optical transceiver 218$c$ is positioned over the first optical pathway 192$a$ and the second optical transceiver 218$d$ is positioned over the second optical pathway 192$b$, thus allowing communication with the optical transceiver 100$x$ when the cover assembly 14 is in both the locked and unlocked positions. Again, reflex sensor model number GP2S60 manufactured by Sharp Electronics Corporation® has been found suitable for this application.

A faceplate 258 conceals the components of the host controller subsystem 242 on the first sidemember 38, as well as the bolts 160 (not shown) securing the first sidemember 38 to the bridge 158. During assembly, threaded fasteners (not shown) secure the PCBA 244 to the faceplate 258 prior to the faceplate 258 being secured to the first sidemember 38. The PCBA 244 has one or more holes 264 which align with threaded receptacles 266 within spacers 268 on the faceplate 258. After securing the PCBA 244 to the faceplate 258, the faceplate 258 is then secured to the first sidemember 38 using threaded fasteners (not shown) through one or more holes 260 that align with threaded receptacles on the exterior surface 188 of the first sidemember 38.

Figure 12:
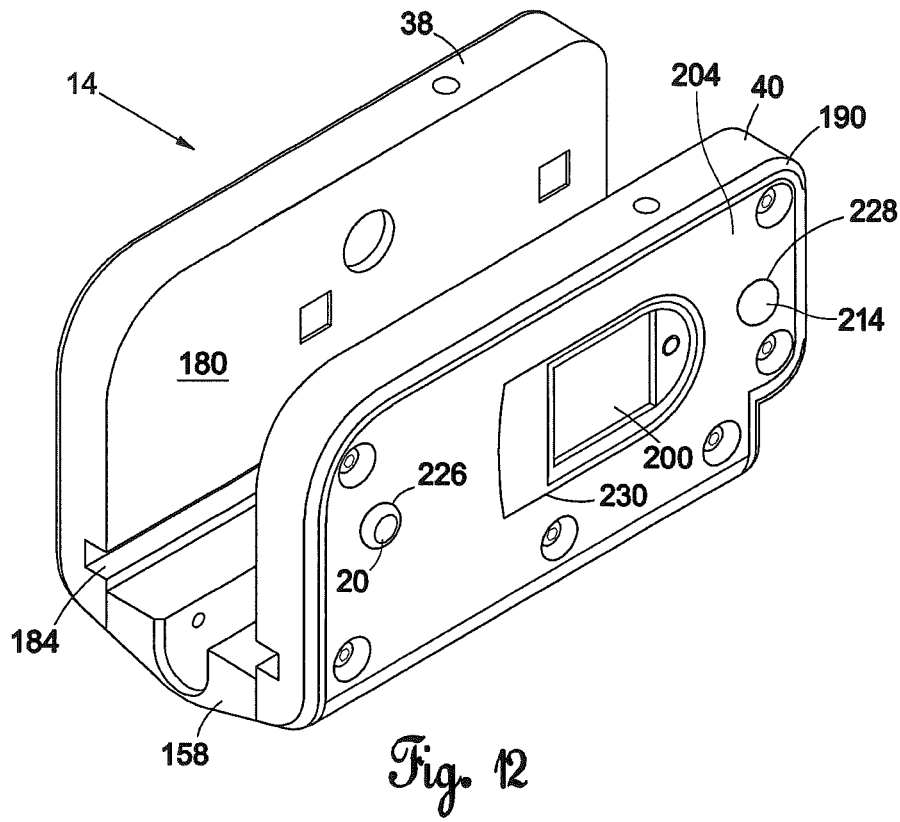
FIG. 12 is a perspective view of the cover assembly showing the rear end of the cover assembly.
Figure 13:
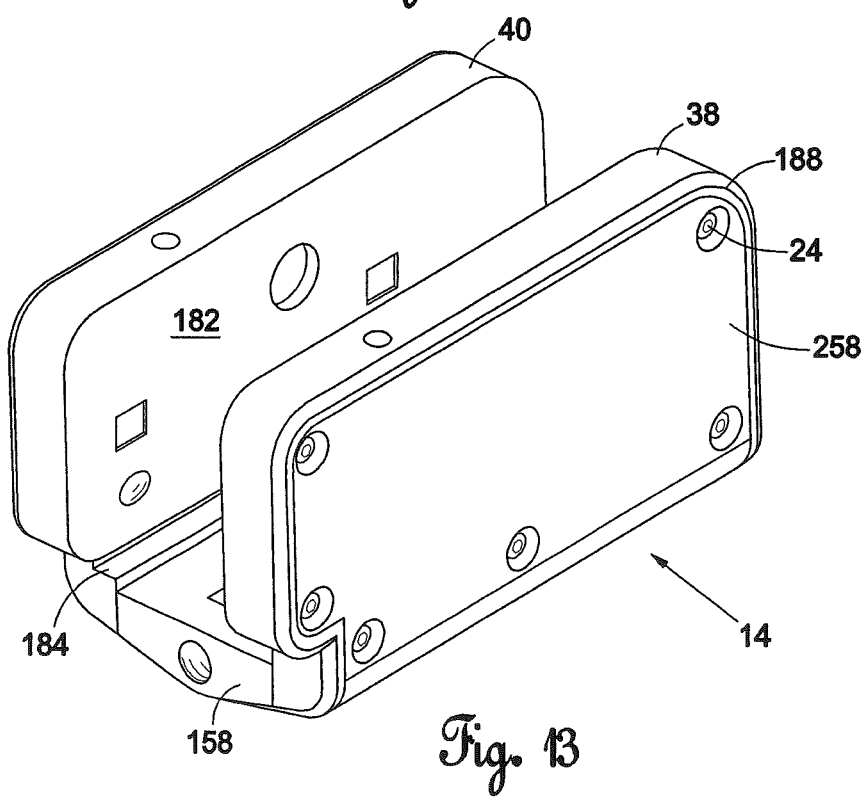
FIG. 13 is a perspective view of the cover assembly showing the front end of the cover assembly.

Referring to FIGS. 12 and 13 the cover assembly 14 is shown assembled. The first and second sidemembers 38, 40 are secured to the bridge 158 and the various components previously discussed are secured to their respective sidemember 38, 40. Each faceplate 204, 258 is within its respective indention 194 in the respective sidemember 38, 40. In FIG. 12, the fingerprint sensor 200 is within—or at least accessible through—the third aperture 230 of the faceplate 204, while the control switch 20 is within the first aperture 226 and the lens 214 is within the second aperture 228 flush with the faceplate 204. In FIG. 13, the first sidemember 38 does not have electronic components extending through the faceplate 258 in this embodiment.

Figure 14:
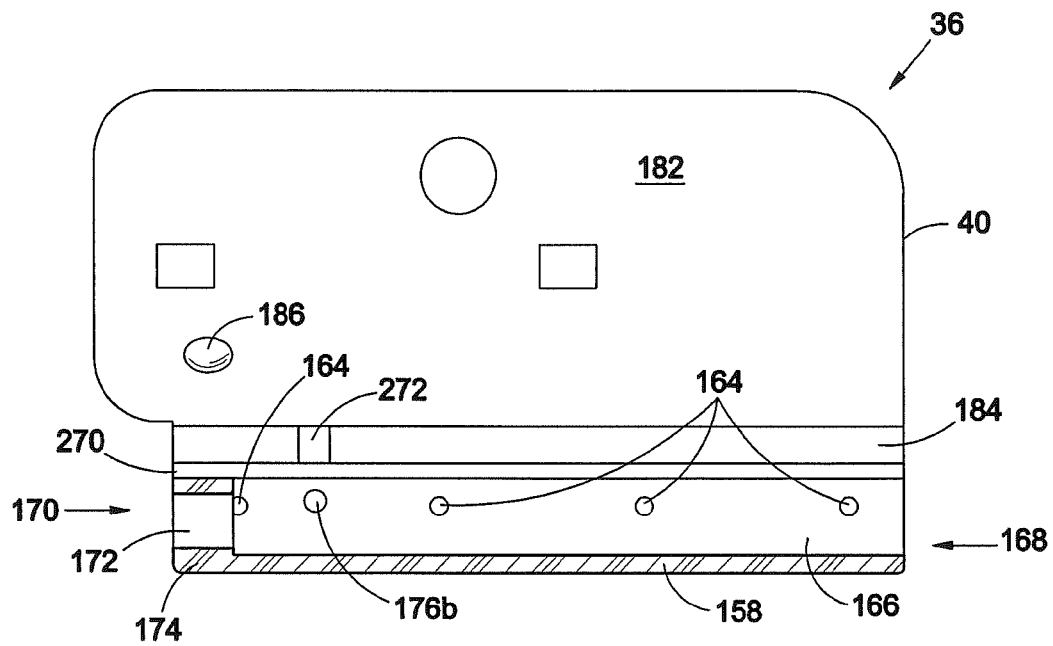
FIG. 14 is a cross section side view of the slide cover with the cross section taken along a vertical plane longitudinally bisecting the slide cover.

FIG. 14 shows a longitudinal cross section of the slide cover 36 taken along a vertical place though the length of the channel 166 in the bridge 158. As such the inner surface 182 of the second sidemember 40 is shown from a side view. The hole 172 for the guide rod 42 extends through the portion 174 at the front end 170 of the bridge 158, and, each of the threaded receptacles 164 can be seen. The guide channel 184 is slightly above the bridge 158, leaving a portion 270 of the inner surface 182 between the guide channel 184 and the bridge 158. The bottom of the guide channel 184 has a channel 272 extending across it, which is part of the bore that forms power cord aperture 198 in the indention 194 (shown in, e.g. FIG. 9). Both channel 272 and its counterpart in the first sidemember 38 provide a volume for positioning the power cord (not shown) so as not to impede movement of the portions 122$a$, 122$b$ of the guide pin 120 through the interior of the guide channel 184.

Figure 15:
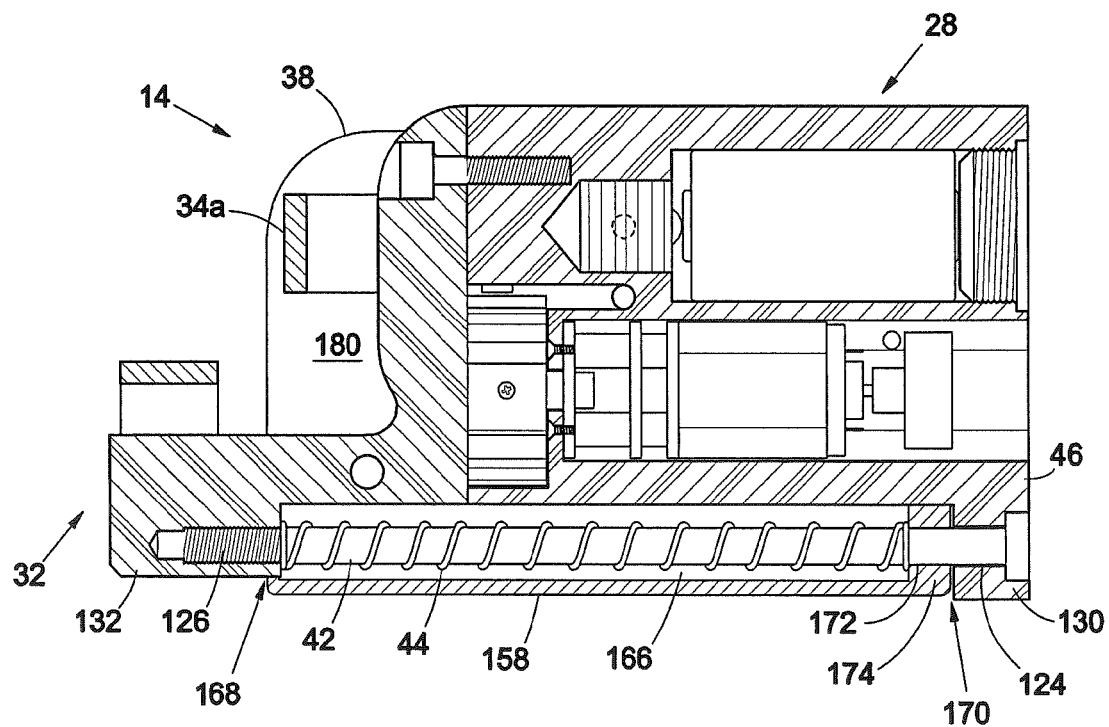
FIG. 15 is a cross section side view of the cover assembly mounted on the lock housing taken along a vertical plane longitudinally bisecting the cover assembly and the lock housing assembly, while the components within the lock housing are not in cross section.

FIG. 15 shows a longitudinal cross-section of the cover assembly 14 mounted to the lock housing assembly 28 and the mount adapter assembly 32 taken along a vertical plane, with the cover assembly 14 in the unlocked position. The inner surface 180 of the first sidemember 38 is behind the upper clamp 34$a$. The guide rod 42 extends through the support hole 124 in the first protrusion 130, through the hole 172 in the portion 174 at the front end 170 of the bridge 158 and into the channel 166. At the end of the channel 166 the guide rod 42 is threaded into the second protrusion 132. The rear end 168 of the bridge 158 is under the second protrusion 132 so that the second protrusion 132 is at least partially within the channel 166.

The spring 44 is also within the channel 166 and the bottom of the bridge 158 conceals the spring 44 along with part of the guide rod 42. In the unlocked position the spring 44 preferably exerts some force against the portion 174 and against the second protrusion 132. Accordingly, the bridge 158 is biased away from the second protrusion 132 and toward the first protrusion 130, causing the cover assembly 14 to remain in the unlocked position. The cover assembly 14, however, is prevented from displacing any further away from the second protrusion 132 due to abutment of the portion 174 of the bridge 158 against the first protrusion 130. Alternatively, the spring 44 may be relaxed while the cover assembly 14 is in the unlocked position.

Figure 16:
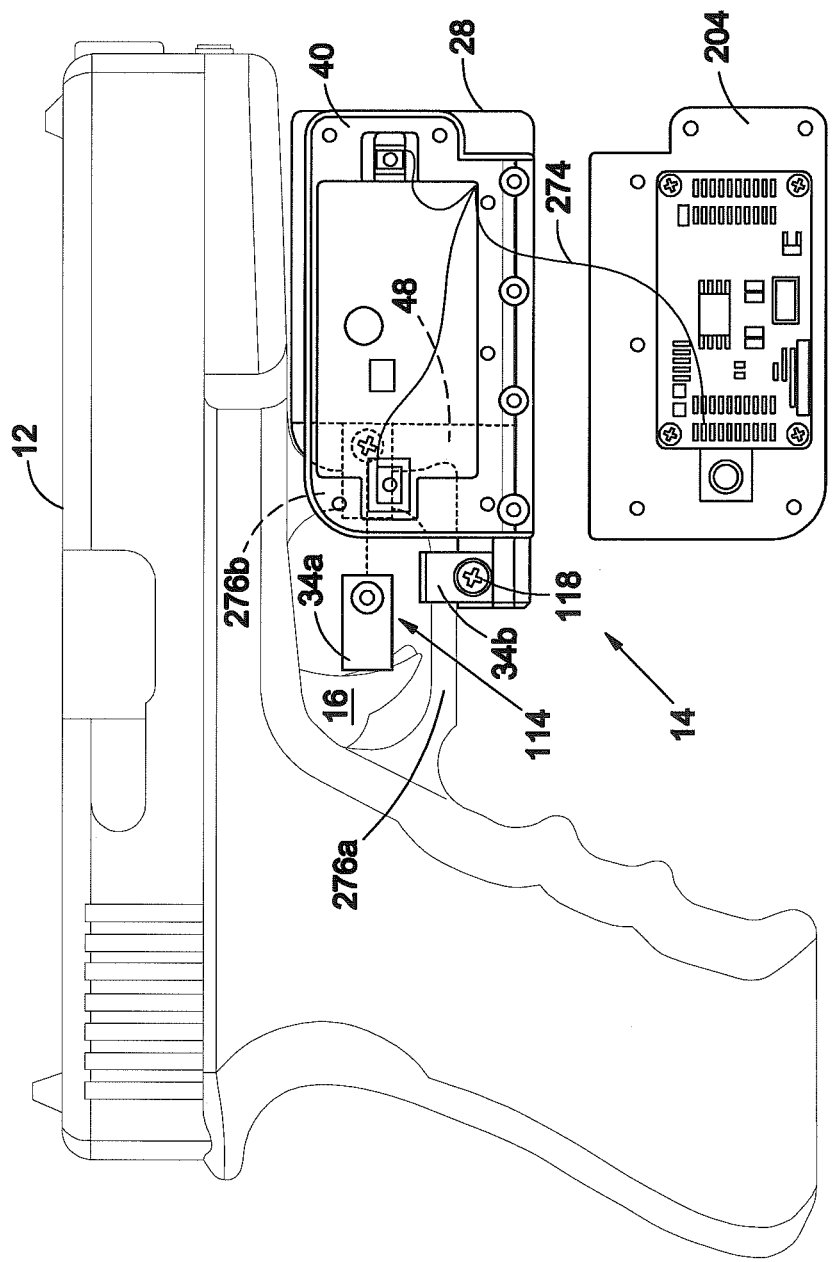
FIG. 16 is a side elevation view with a faceplate removed from the cover assembly during one step of installing the trigger lock on the firearm.

FIG. 16 shows one stage of the trigger lock 10 being installed on the firearm 12 with the trigger 16 of the firearm 12 exposed. The faceplate 204 has not yet been installed on the second sidemember 40 and is hanging from one of the power cords 274. With the cover assembly 14 in the unlocked position, a horizontal length 276$a$ of a trigger guard 276 on the firearm 12 is exposed. As such, the lower clamp 34$b$ may be placed over the horizontal length 276$a$ and the threaded fastener 118 installed, thereby partially securing the mount adapter 48 and lock housing assembly 28 to the trigger guard 276. In contrast, a vertical length 276$b$ of the trigger guard 276 is concealed behind the sidemembers 38, 40 and the receptacle 110 (shown in FIG. 3) in the mount adapter 48 is not accessible to secure the upper clamp 34$a$. However, the upper clamp 34$a$ may still be inserted between the sidemembers 38, 40 and positioned over the vertical length 276$b$ of the trigger guard 276. In doing so, each bored area 114 of the upper clamp 34a is inserted within its respective indention 112 (shown in FIG. 3) in the mount adapter 48 to hold the upper clamp 34a in place for the next stage of installation.

Figure 17:
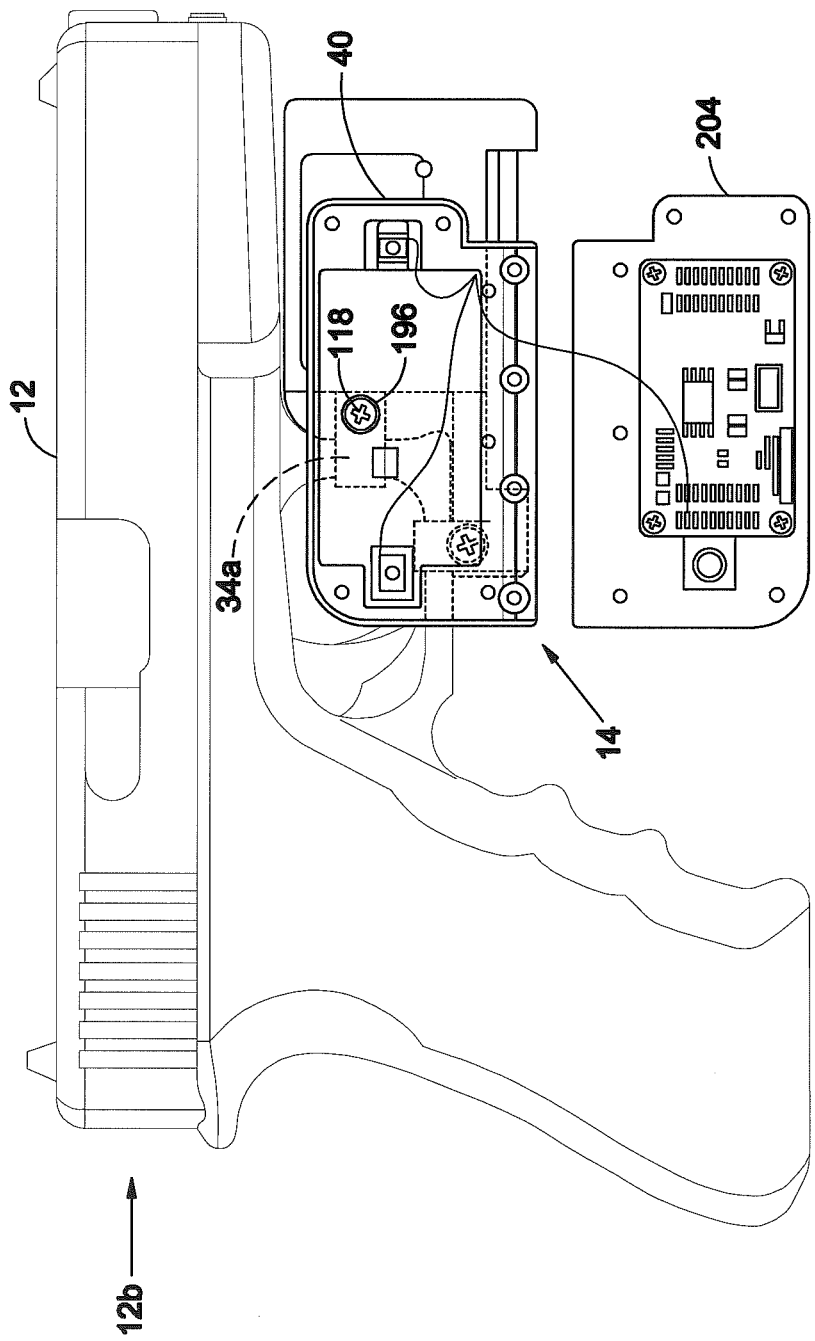
FIG. 17 is a side elevation view with the faceplate removed from the cover assembly during another step of installing the trigger lock on the firearm.

FIG. 17 shows the next stage of installation. The cover assembly 14 has been displaced from the unlocked position approximately halfway toward the grip end 12b of the firearm 12. The faceplate 204 has not yet been secured to the second sidemember 40, leaving the mount aperture 196 exposed. The mount aperture 196 is aligned with the hole 116 in the bored area 114 (shown in FIG. 3) of the concealed upper clamp 34a and the threaded fastener 118 can be inserted through the mount aperture 196 along with a screwdriver or other suitable tool (not shown) to tighten the threaded fastener 118. This installation process is similarly applicable to the first sidemember 38 on the other side of the trigger lock 10.

Figure 18:
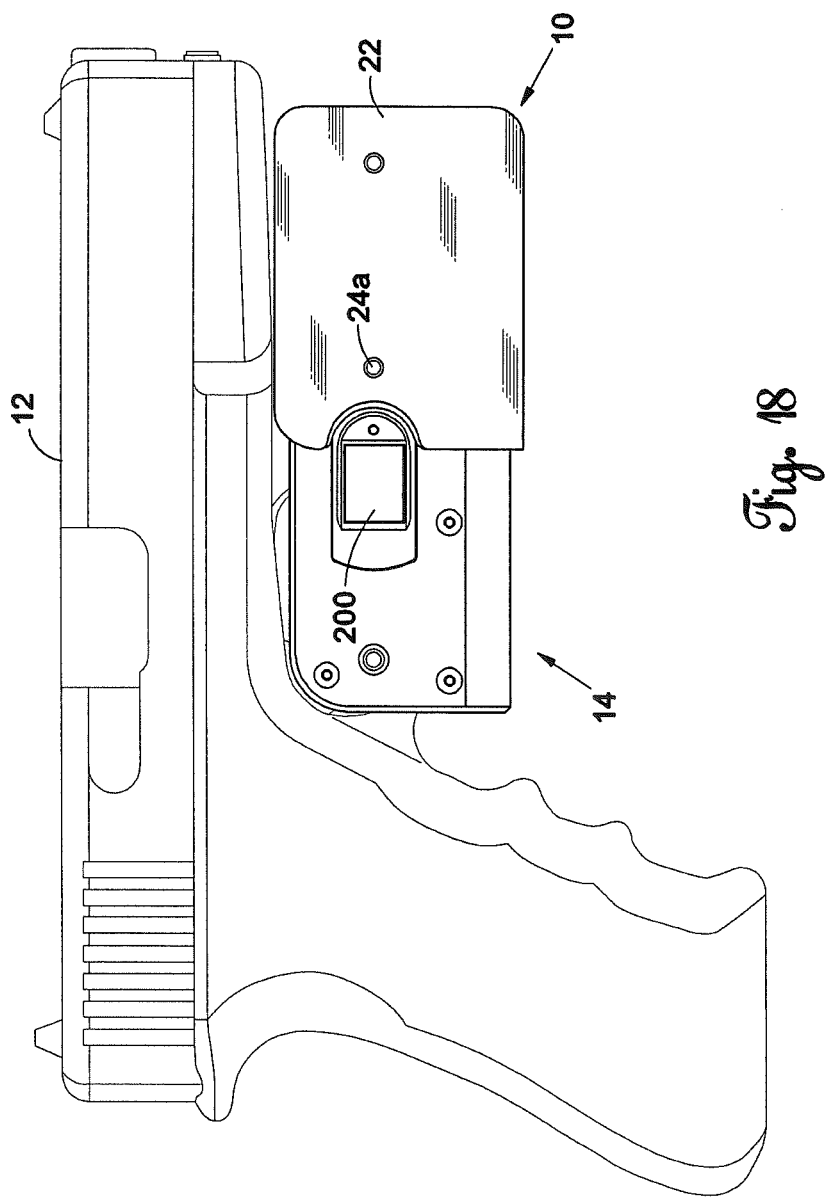
FIG. 18 is a side elevation view of the preferred embodiment installed on the firearm with the cover assembly in the locked position.

FIG. 18 shows the trigger lock 10 fully installed on the firearm 12 with the cover assembly 14 in the locked position. A first lens 24a on the sheath 22 is aligned with the light source 212 and lens 214 on the second sidemember 40 under the sheath 22. With these items aligned, the status of command operations (e.g., valid/invalid fingerprint read) of the trigger lock 10 can be displayed by the light source 212 while the cover assembly 14 is in the locked position. The trigger 16 is concealed behind the cover assembly 14 and is inaccessible. The fingerprint sensor 200, however, remains exposed for use.

Figure 19:
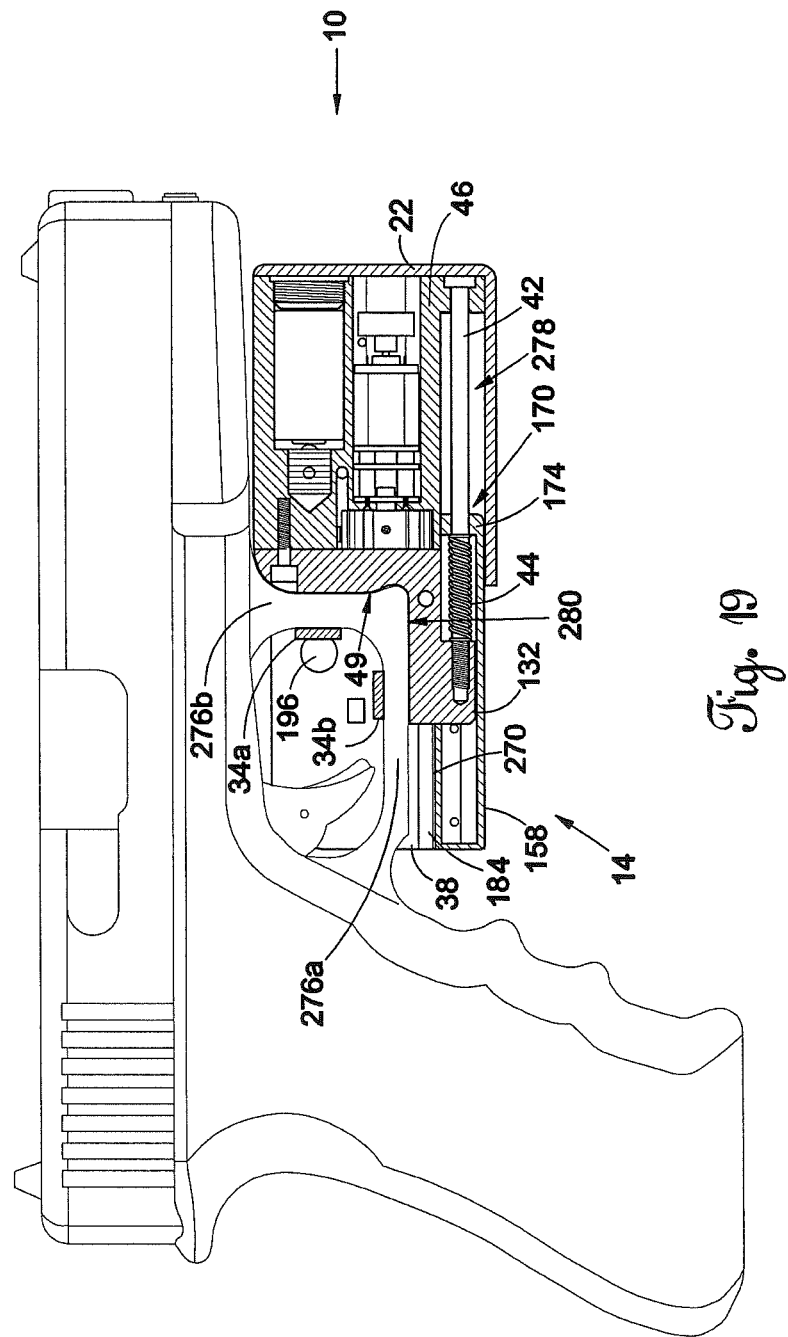
FIG. 19 is a cross section side view of the embodiment in FIG. 18 taken along a vertical plane longitudinally bisecting the cover assembly and the lock housing assembly while the components within the lock housing assembly are not in cross section.

FIG. 19 shows the cover assembly 14 in the locked position. The portion 174 at the front end 170 of the bridge 158 has been displaced along the guide rod 42 toward the second protrusion 132, thereby reducing the space for the spring 44 and creating an open space 278 between the housing body 46 and the sheath 22. The spring 44 is compressed and, therefore, applies a greater amount of force than was applied with the cover assembly 14 in the unlocked position. Both the upper and lower clamps 34a, 34b are concealed by the sidemember 38 and the mount aperture 196 on the sidemember 38 is not aligned with the threaded fasteners 118 on the upper clamp 34a. Thus, an unauthorized person cannot access either clamp 34 when the cover assembly 14 is in the locked position, even if that person removed the sheath 22 and removed either or both of the faceplates 204, 258 from the sidemembers 38, 40.

FIG. 19 also shows the mount surface 49 is contoured to correspond with an outer surface 280 of the trigger guard 276. Thus, mount surface 49 can mate with the outer surface 280 of the trigger guard 276 along at least a portion of the vertical length 276b and along at least a portion of the horizontal length 276a. Each clamp 34 extends over the trigger guard 276 and helps hold the mount surface 49 mated with the outer surface 280 of the trigger guard 276. A protective coating (not shown) may be applied to each clamp 34 and/or the mount surface 49 in order to protect the trigger guard 276 from being scratched or otherwise damaged.

The removable mount adapter 48 allows the trigger lock 10 to be a universal option for all firearms with trigger guards. In this regard, an entire production line of removable mount adapters 34 may be developed with each mount adapter 48 having a mount surface 49 that corresponds with the shape and contour of a trigger guard for particular makes and models of firearms. As such, the removable mount adapter 48 may be selected and installed on the housing body 46 of the lock housing assembly 28 according to which mount surface 49 is needed for the particular make and model of firearm.

Figure 20:
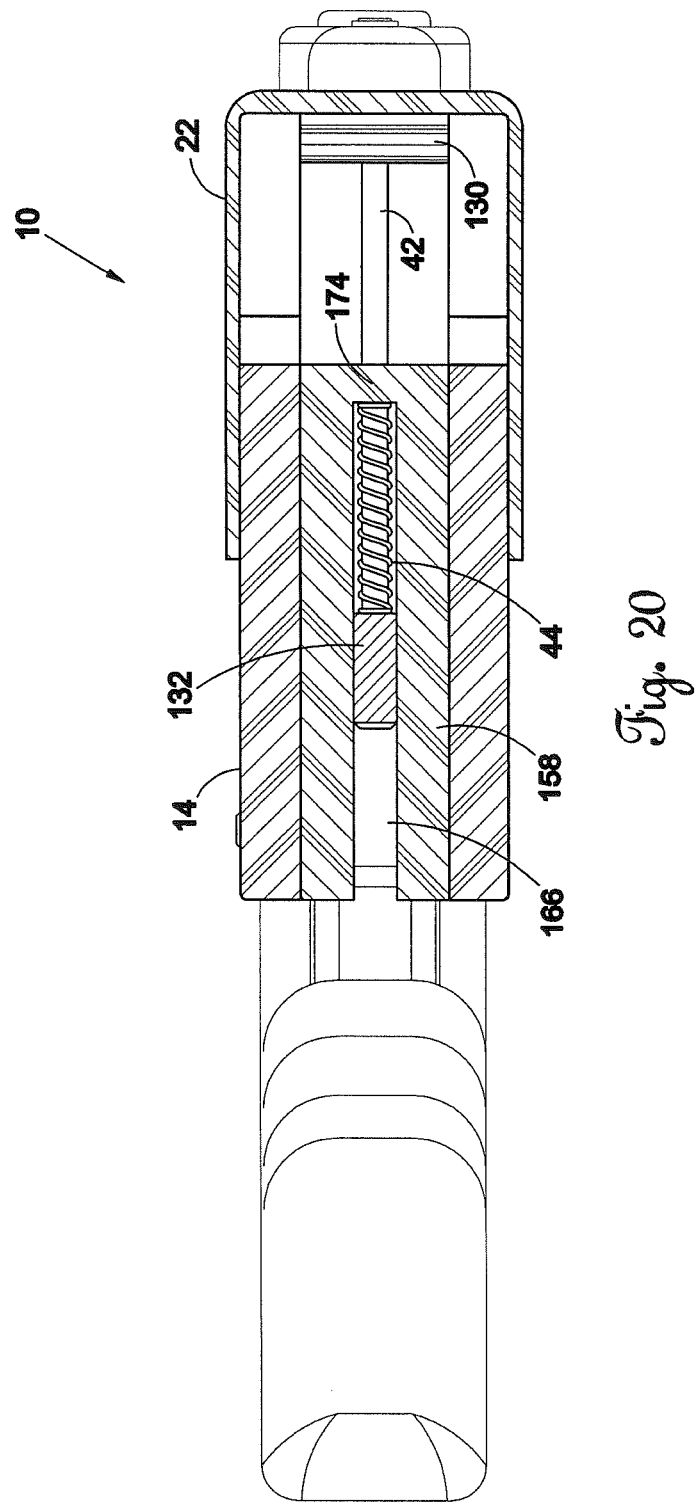
FIG. 20 is a cross section bottom view of the embodiment in FIG. 18 taken along a horizontal plane longitudinally bisecting the cover assembly and the lock housing assembly with the cover assembly in the locked position.

FIG. 20 shows a longitudinal cross section of the trigger lock 10 taken along a horizontal plane, with the cover assembly 14 in the locked position and the sheath 22 installed. The bottom of the bridge 158 is removed and the precision fit of the second protrusion 132 within the channel 166 in this embodiment is illustrated. The channel 166 is slightly wider than the second protrusion 132, leaving minimal space between the items. The second protrusion 132 thus provides stability as the cover assembly 14 is pulled to the locked position from the unlocked position while the second protrusion 132 remains static. Part of the guide rod 42 is exposed between the first protrusion 130 and the portion 174, while the spring 44 is compressed between the portion 174 and the second protrusion 132.

Figure 21:
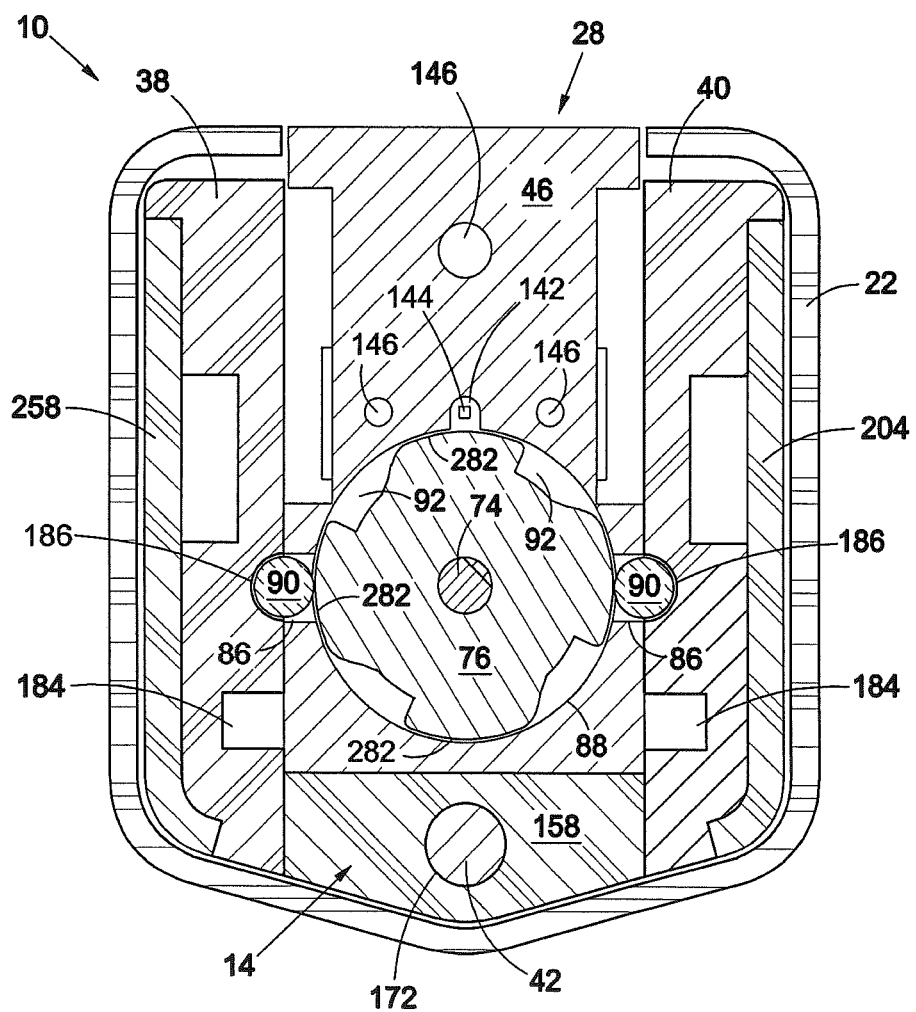
FIG. 21 is a cross section end view of the preferred embodiment with the cover assembly in the locked position, the cross section being taken along a vertical plane laterally bisecting the lock housing assembly.

FIG. 21 shows a lateral cross-section of the trigger lock 10 taken along a vertical plane through the lock housing assembly 28, looking into the housing body 46. The cover assembly 14 is in the locked position and each ball bearing 90 is partially within its respective recess 186 in the sidemembers 38, 40. The portion of each ball bearing 90 which is not within its respective recess 186 is within its respective guide hole 86. Each guide hole 86 extends into the rotor compartment 88. The lock rotor 76 is rotated about the drive shaft 74 such that none of the voids 92 is adjacent to each guide hole 86. Instead, one of the arced surfaces 282 along the major diameter of the lock rotor 76 is adjacent each guide hole 86 and prevents each bearing 90 from exiting its respective recess 186, thereby locking the cover assembly 14 in place over the trigger 16. Together, the voids 92 and the arced surfaces 282 act as a camming surface to displace the ball bearings 90.

Figure 22:
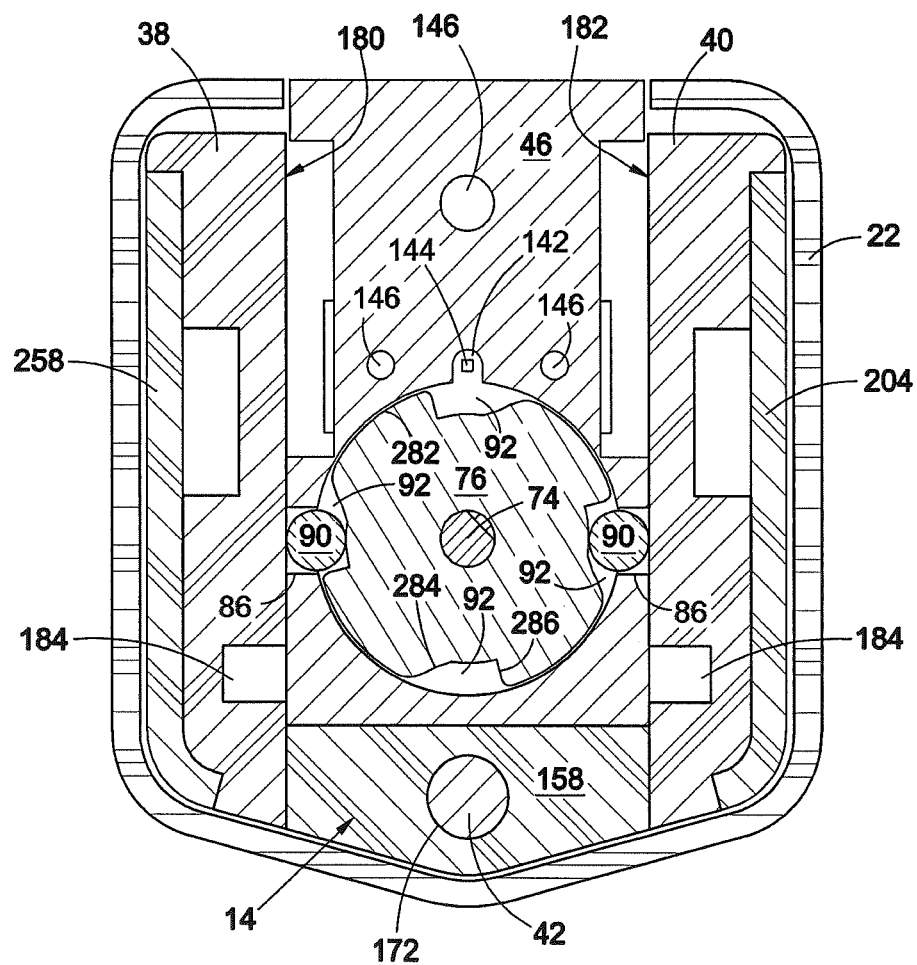
FIG. 22 is a cross section end view of the preferred embodiment with the cover assembly in the unlocked position, the cross section being taken along a vertical plane laterally bisecting the embodiment.

FIG. 22 shows the same lateral cross-section of the trigger lock 10 as was shown in FIG. 21 but with the cover assembly 14 in the unlocked position. Each ball bearing 90 has been displaced within its respective guide hole 86 and has exited its respective recess 186 in the sidemembers 38, 40. The recesses 186 cannot be seen, however, because they have been displaced toward the muzzle end 12a of the firearm 12. With each ball bearing 90 exited from its respective recess 186, the portion of each ball bearing 90 which was within its respective recess 186 in FIG. 21 has been displaced into its respective guide hole 86. Additionally, the portion of each ball bearing 90 which was within its respective guide hole 86 in FIG. 21 has been displaced into one of the voids 92 on the lock rotor 76 and the ball bearing 90 rests on the minor diameter of the lock rotor 76.

To achieve displacement of each ball bearing 90, the lock rotor 76 is rotated in a counterclockwise direction about the drive shaft 74 such that one of the voids 92 is adjacent each guide hole 86. Once the lock rotor 76 has been rotated to this position, the inner surface of each recess 186 exerts force against its respective ball bearing 90 as the spring 44 biases the cover assembly 14 toward the unlocked position. The force of the inner surface of each recess 186 against its respective ball bearing 90 causes the ball bearing 90 to exit the recess 186 as the cover assembly 14 is displaced by the spring 44. Once in the unlocked position, the inner surfaces 180, 182 of the first and second sidemember 38, 40 prevent each ball bearing 90 from exiting its respective guide hole 86.

The voids 92 on the lock rotor 76 are shaped to create efficient displacement of each ball bearing 90 in this embodiment. All of the voids 92 are shaped and sized the same, and so are the arced surfaces 282, making the voids 92 evenly spaced about the lock rotor 76. Each of the voids 92 has a gradually inclined surface 284 which gradually forces the ball bearing 90 into the recess 186 when the lock rotor 76 is rotated counterclockwise during the locking operation, thus reducing the power necessary to rotate the lock rotor 76 and lock the device. In contrast, each of the voids 92 has a steeply inclined surface 286 on the other side for rapid displacement of the ball bearing 90 from the recess 186 when the lock rotor 76 is rotated counterclockwise during the unlocking operation.

FIGS. 21 & 22 also show a precision fit between elements of the trigger lock 10. The sheath 22 is shown largely surrounding the remainder of the device. Within the sheath 22 are the sidemembers 38, 40 and the respective faceplate 204, 258 mounted thereon. Between the sidemembers 38, 40 is the bridge 158 with the guide rod 42 through the hole 172. The guide channel 184 along each sidemember 38, 40 is also shown. During locking and unlocking each channel 184 displaces over the portions 122a, 122b (shown in FIG. 6) of the guide pin 122 while the guide pin 122 remains static on the mount adapter 48. Accordingly, the guide pin 122 helps stabilize the cover assembly 14. Also shown are the receptacles 146 for mounting the mount adapter 48 to the lock housing assembly 28.

FIGS. 21 & 22 also illustrate how the position sensor 144 detects the position of the lock rotor 76. With the cover assembly 14 in the locked position shown in FIG. 21, the position sensor 144 detects one of the arced surfaces 282 of the lock rotor 76 being adjacent to it; whereas with the cover assembly 14 in the unlocked position shown in FIG. 22, the position sensor 144 detects one of the voids 92 being adjacent to it. A suitable position sensor 144 for this application is a reflex sensor bearing model number GP2S60 offered by Sharp® Electronics Corporation. In this application, the position sensor 144 act as a true reflex sensor—i.e., emitting a light signal and measuring whether light is reflected back—to determine the position of the lock rotor 76. Thus, for example, when one of the arced surfaces 282 is adjacent the sensor 144 no light is reflected back and when one of the voids 92 is adjacent the sensor 144 light is reflected back.

Figure 23:
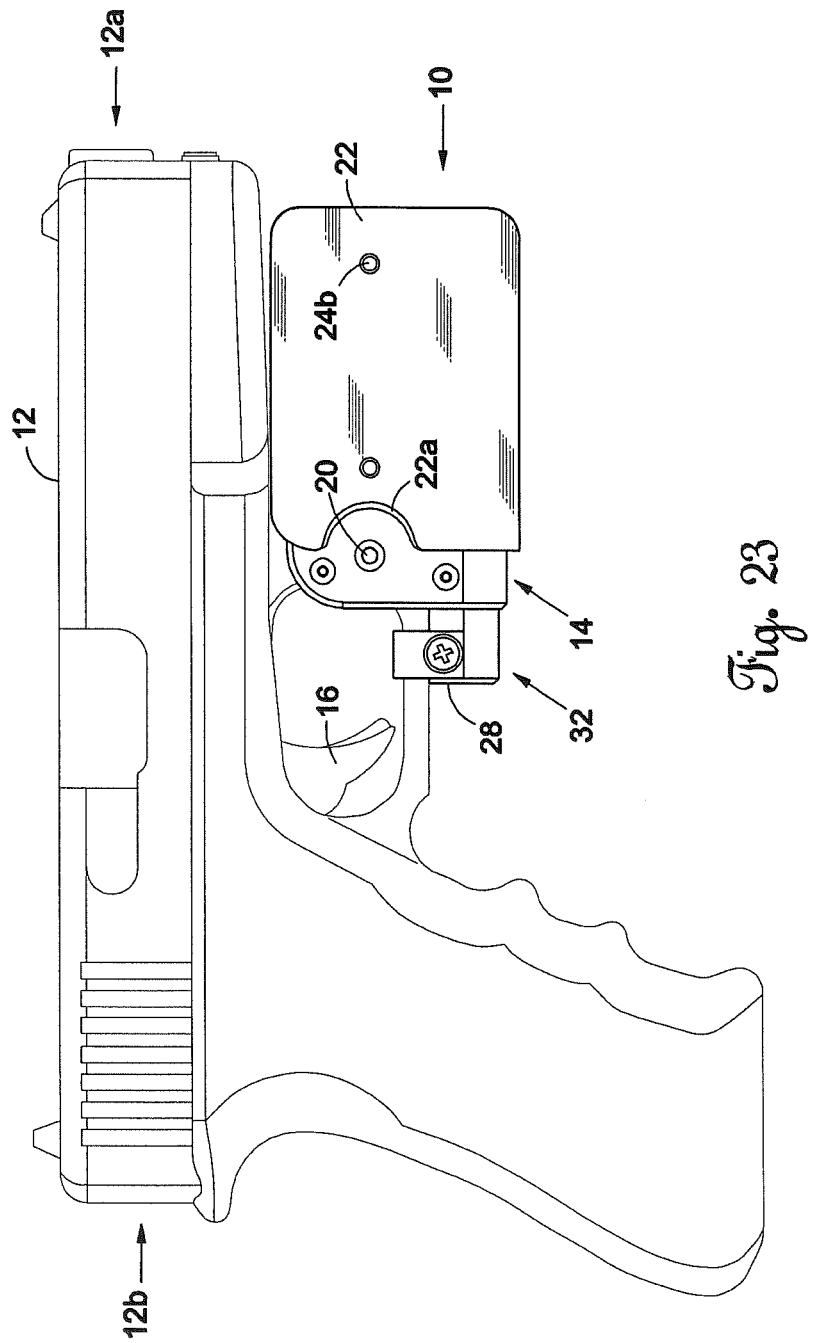
FIG. 23 is a side view of the preferred embodiment installed on the firearm with the cover assembly in the unlocked position.

FIG. 23 shows the trigger lock 10 with the cover assembly 14 in the unlocked position. It has been displaced in a direction from the grip end 12b toward the muzzle end 12a of the firearm 12 while the mount adapter assembly 32, the lock housing assembly 28, and sheath 22 have remained static. In the unlocked position the trigger 16 is accessible for operation of the firearm 12. The fingerprint sensor 18 is within the sheath 22 but the control switch 20 remains accessible through a cutout 22a in the sheath 22. Additionally, the sheath 22 has a second lens 24b aligned with the light source 212 and lens 214 on the second sidemember 40 under the sheath 22. With these items aligned, the status of command operations (e.g., start locking sequence) in the trigger lock 10 can be displayed by the light source 212 while the cover assembly 14 is in the unlocked position.

Figure 24:
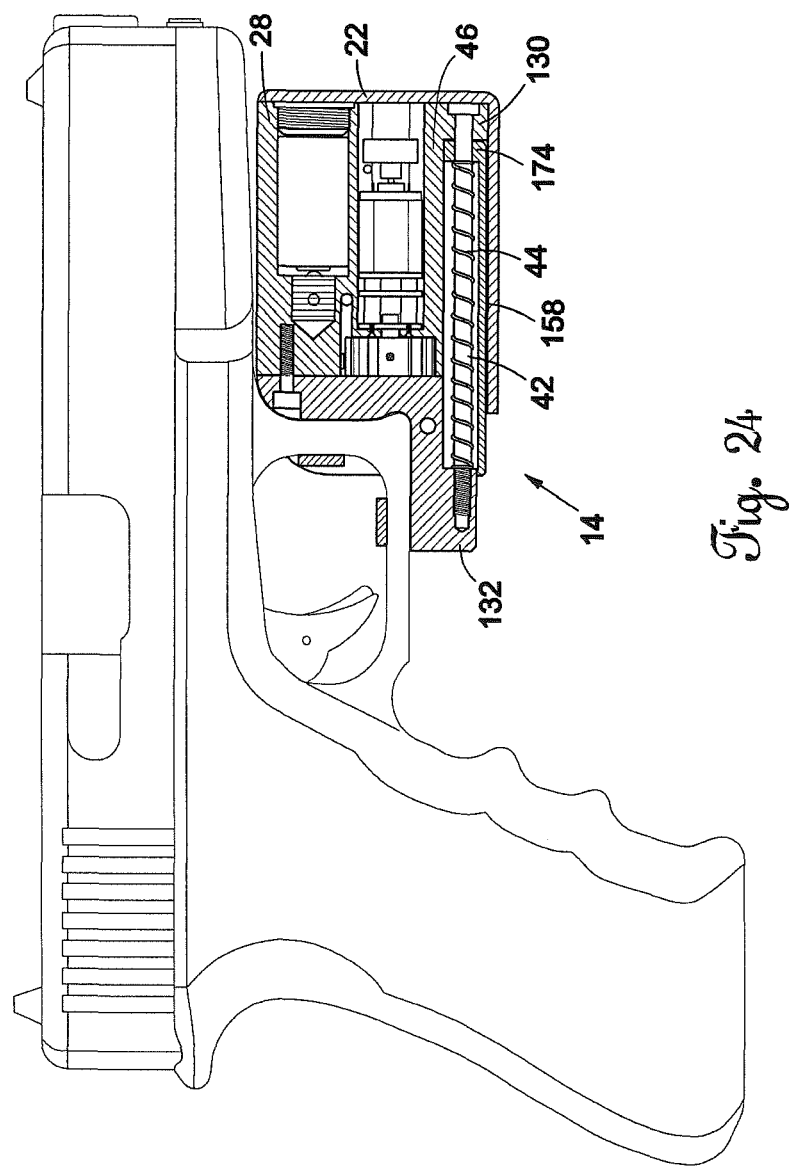
FIG. 24 is a cross section side view of the embodiment in FIG. 23 taken along a vertical plane longitudinally bisecting the cover assembly and the lock housing assembly while the components within the lock housing assembly are not in cross section.

FIG. 24 shows the cover assembly 14 in the unlocked position. The portion 174 of the bridge 158 has been displaced along the guide rod 42 away from the second protrusion 132 and toward the first protrusion 130. In doing so, the bridge 158 is displaced into the space 278 between the housing body and the sheath 22 that was shown in FIG. 19. The force of the spring 44 on the portion 174 of the bridge 158 causes this displacement and the spring 44 is shown in a less compressed state than it was with the cover assembly 14 in the locked position.

Figure 25:
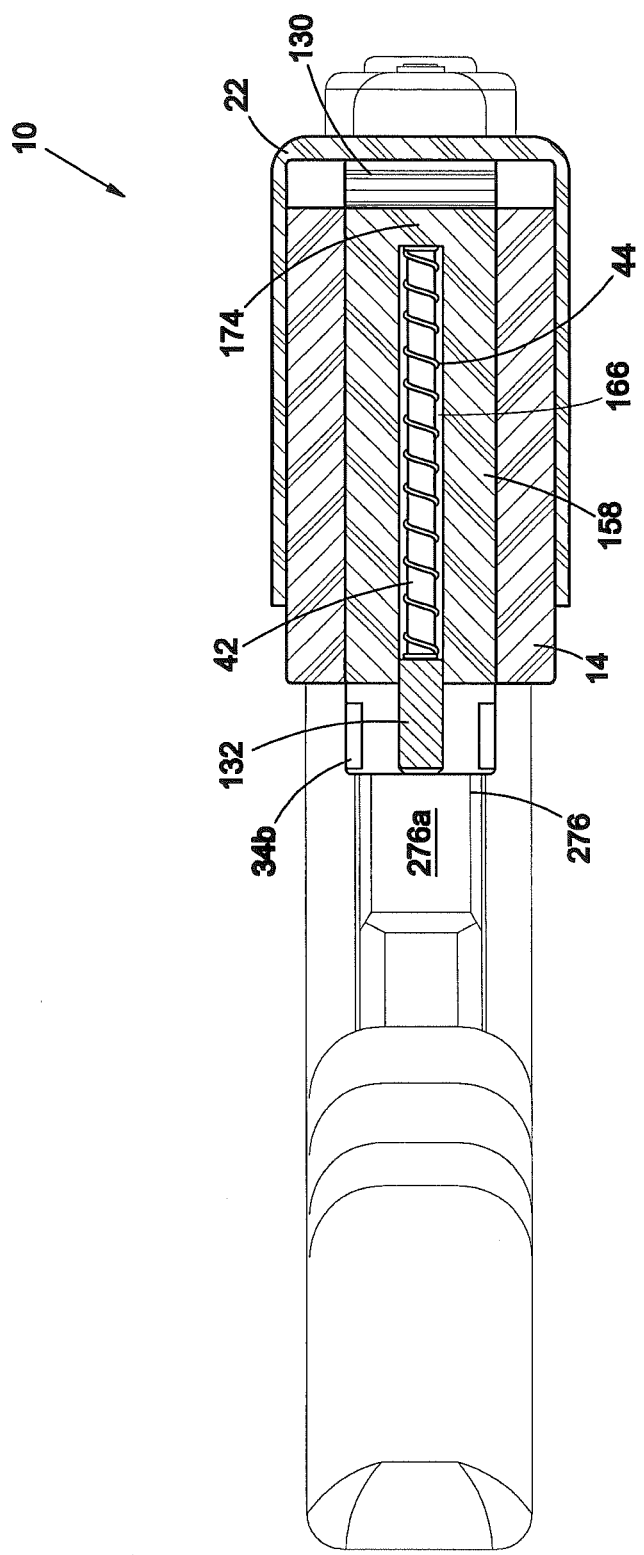
FIG. 25 is a cross section bottom view of the embodiment in FIG. 23 taken along a horizontal plane longitudinally bisecting the cover assembly and the lock housing assembly with the cover assembly in the unlocked position.

FIG. 25 shows a longitudinal cross section of the trigger lock 10 taken along a horizontal plane with the cover assembly 14 in the unlocked position and the sheath 22 installed. The bottom of the bridge 158 is removed and the precision fit of the second protrusion 132 within the channel 166 in this embodiment is illustrated. The channel 166 displaces along the second protrusion 132 when the cover assembly 14 is biased to the unlocked position. The guide rod 42 is largely between the second protrusion 132 and the portion 174 of the bridge 158. The portion 174 abuts the first protrusion 130 and the spring 44 is less compressed between the portion 174 and the second protrusion 132 than it was in FIG. 20. The second protrusion 132 is shown between the ends of lower clamp 34b, while the lower clamp 34b extends over the horizontal component 276a of the trigger guard 276.

It should be noted here that other means for biasing the cover assembly 14 are contemplated by the present invention. These include a worm drive assembly where, for example, a worm driven by the motor 70 in the lock housing assembly 28 meshes with a worm gear on the cover assembly 14 (not shown), a leadscrew assembly designed to translate rotational motion of the motor 70 into translational motion of the cover assembly 14, and a rack and pinion system between the lock housing assembly 28 and the cover assembly 14, with the pinion driven by the motor 70 and the rack on the cover assembly 14.

It should also be noted other locking means for preventing displacement of the cover assembly from the locked position toward the unlocked position are contemplated by the present invention. These include a locking means using a solenoid system where a solenoid displaces a locking member between the cover assembly 14 and the lock housing assembly 28.

Additionally, the locking means may be electronically incorporated into the means for biasing the cover assembly 188. For example, with a worm drive assembly as the biasing means the worm drive may be activated only when a suitable deactivation parameter is present. Thus, the worm drive assembly acts as the locking means when it is not activated—i.e., preventing displacement of the cover assembly 14 from the locked position toward the unlocked position—and as the biasing means—i.e., biasing the cover assembly 14 from the locked position toward the unlocked position.

Figure 26:
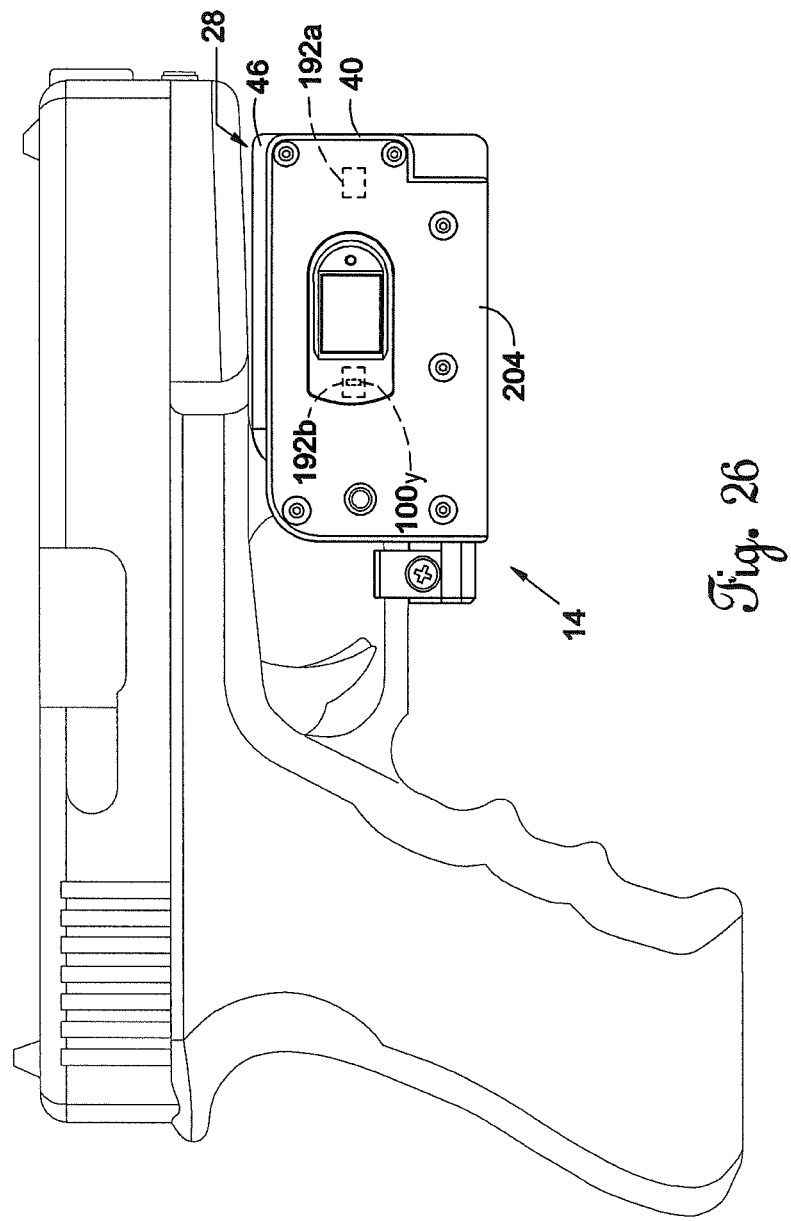
FIG. 26 is a side view showing the positioning of optical transceivers on the cover assembly relative to optical transceivers on the lock housing assembly in the unlocked position.
Figure 27:
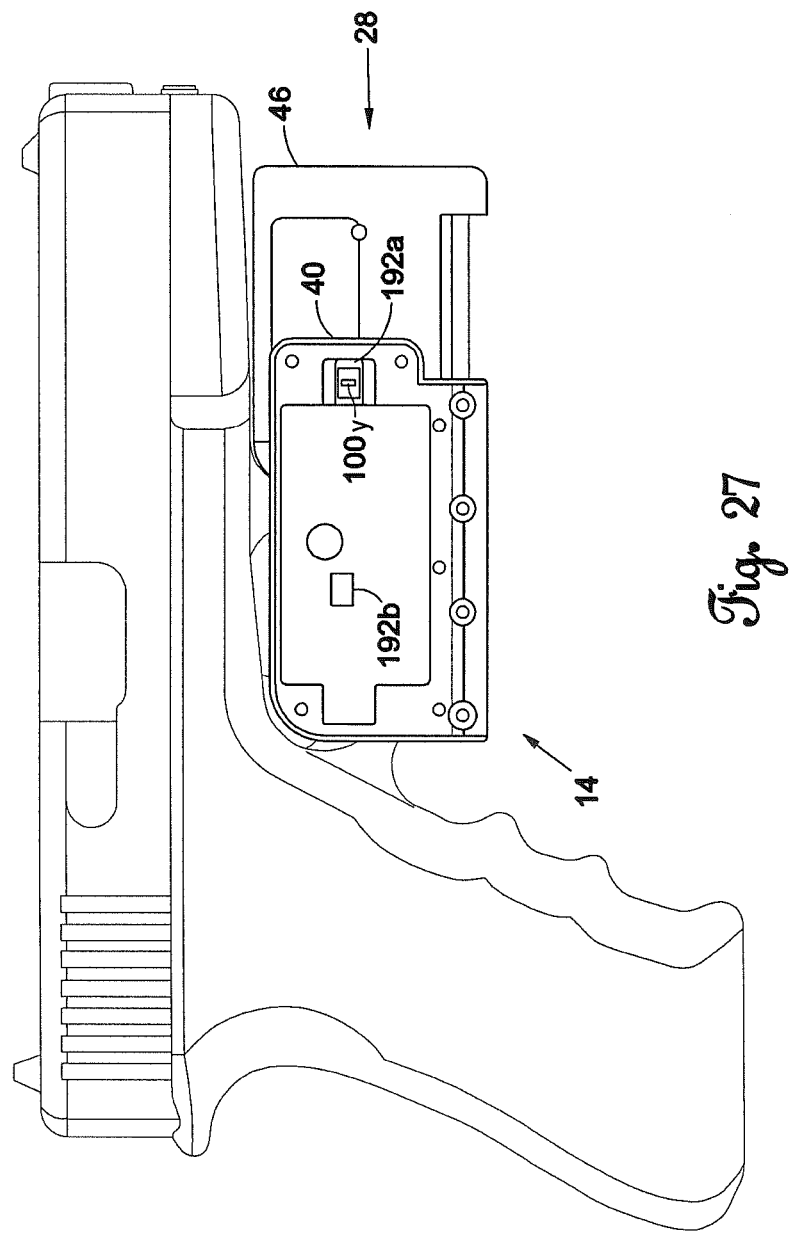
FIG. 27 is a side view showing the positioning of optical transceivers on the cover assembly relative to optical transceivers on the lock housing assembly in the locked position.

FIGS. 26 & 27 show how the optical transceivers on the cover assembly 14 communicate with the optical transceivers on the lock housing assembly 28. In FIG. 26 the faceplate 204 is included but it is removed in FIG. 27.

In FIG. 26, the optical transceiver 100y on the housing body 46 is aligned with the second optical pathway 192b through the second sidemember 40. As noted in the discussion of FIG. 10 supra, the second optical transceiver 218b is positioned over the second optical pathway 192b through the second sidemember 40. Accordingly, the second optical transceiver 218b may transmit and receive optical signals to and from the optical transceiver 100y on the housing body 46 using the second optical pathway 192b when the cover assembly 14 is in the unlocked position as shown in FIG. 26. In contrast, the first optical pathway 192a through the second sidemember 40 is not aligned with the optical transceiver 100y in FIG. 26.

Referring to FIG. 27, the cover assembly 14 is in the locked position and the first optical pathway 192a is aligned with the optical transceiver 100y on the housing body 46, while the second optical pathway 192b is not. Again as noted in the discussion of FIG. 10 supra, the first optical transceiver 218a is positioned over the first optical pathway 192a through the second sidemember 40 and, therefore, the optical transceiver 100y on the second side of the housing body 46 can optically communicate with the first optical transceiver 218a on the second sidemember 40 when the cover assembly 14 is in the locked position.

Though not shown, the foregoing discussion of optical communication applies equally to the optical transceivers on the other side of the trigger lock 10. In this regard, the optical transceiver 100x on the first side of the housing body 46 shown in FIG. 2, communicates with the first and second optical transceivers 218c, 218d using the first and second optical pathways 192a, 192b through the first sidemember 38 shown in FIG. 11. Accordingly, the first optical pathway 192a through the first sidemember 38 is aligned with the optical transceiver 100x when the cover assembly 14 is in the locked position while the second optical pathway 192b through the first sidemember 38 is aligned with the optical transceiver 100x when the cover assembly 14 is in the unlocked position.

Figure 28:
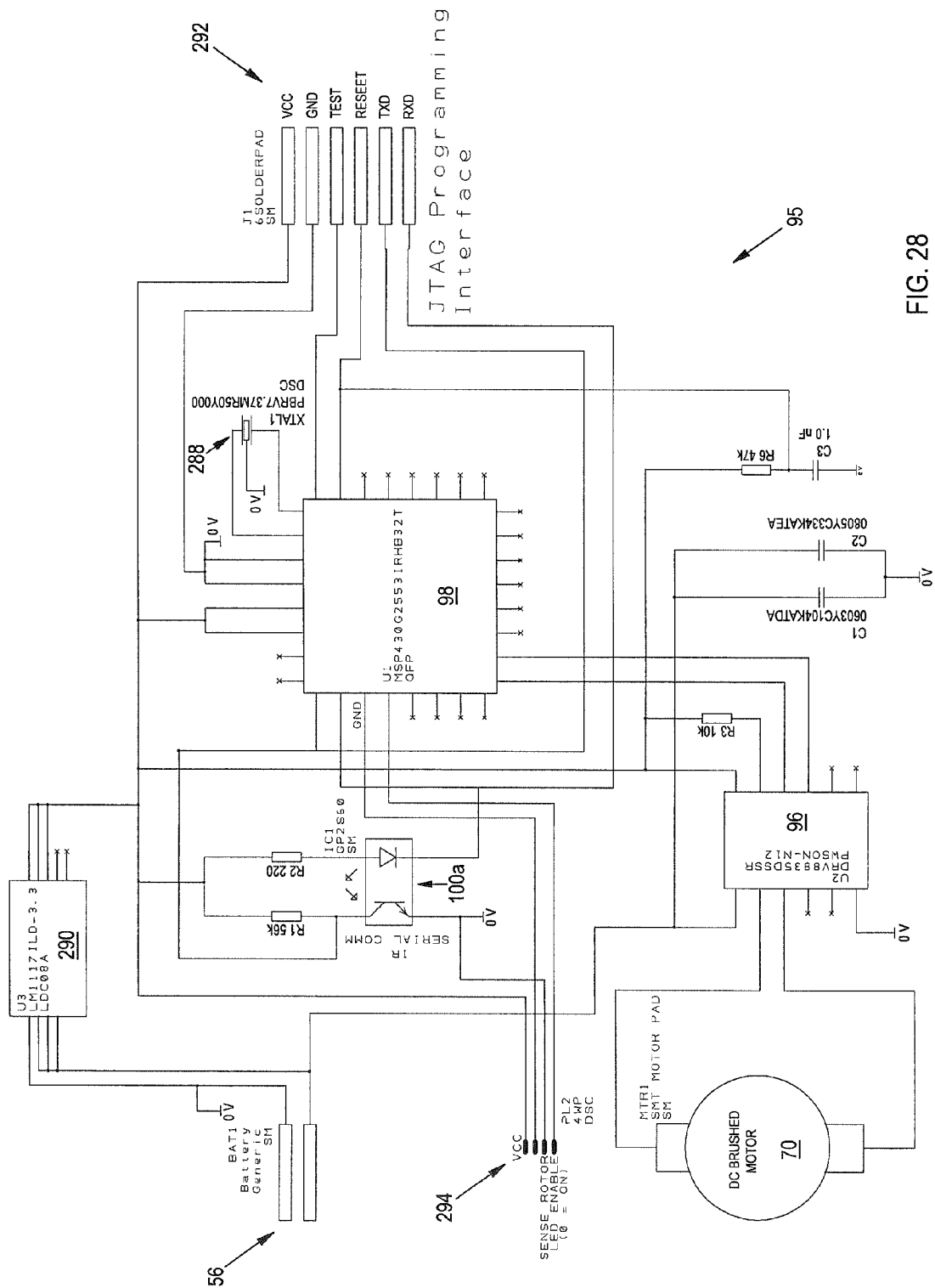
FIG. 28 is a circuit diagram of a motor controller subsystem in the preferred embodiment of the present invention.

Referring to FIG. 28, the motor controller subsystem 95 secured to the first side of the housing body 46 in this embodiment is shown in a circuit diagram including the motor driver 96, the motor microcontroller 98, an oscillator 288, and a voltage regulator 290. The motor microcontroller 98 may be accessed through a programming interface 292. The motor microcontroller 98 is in optical communication with the host controller subsystem 242 through the first optical transceiver 100a (shown in FIG. 2) on the second side of the housing body 46. The motor 70 is connected to the motor controller subsystem 95 through the motor driver 96. The battery 56 within the lock housing assembly 28 is connected to the voltage regulator 290 and the motor driver 96. For illustration purposes, a break 294 shows the connection of the motor controller subsystem 95 to the position sensor 144.

Figure 29A:
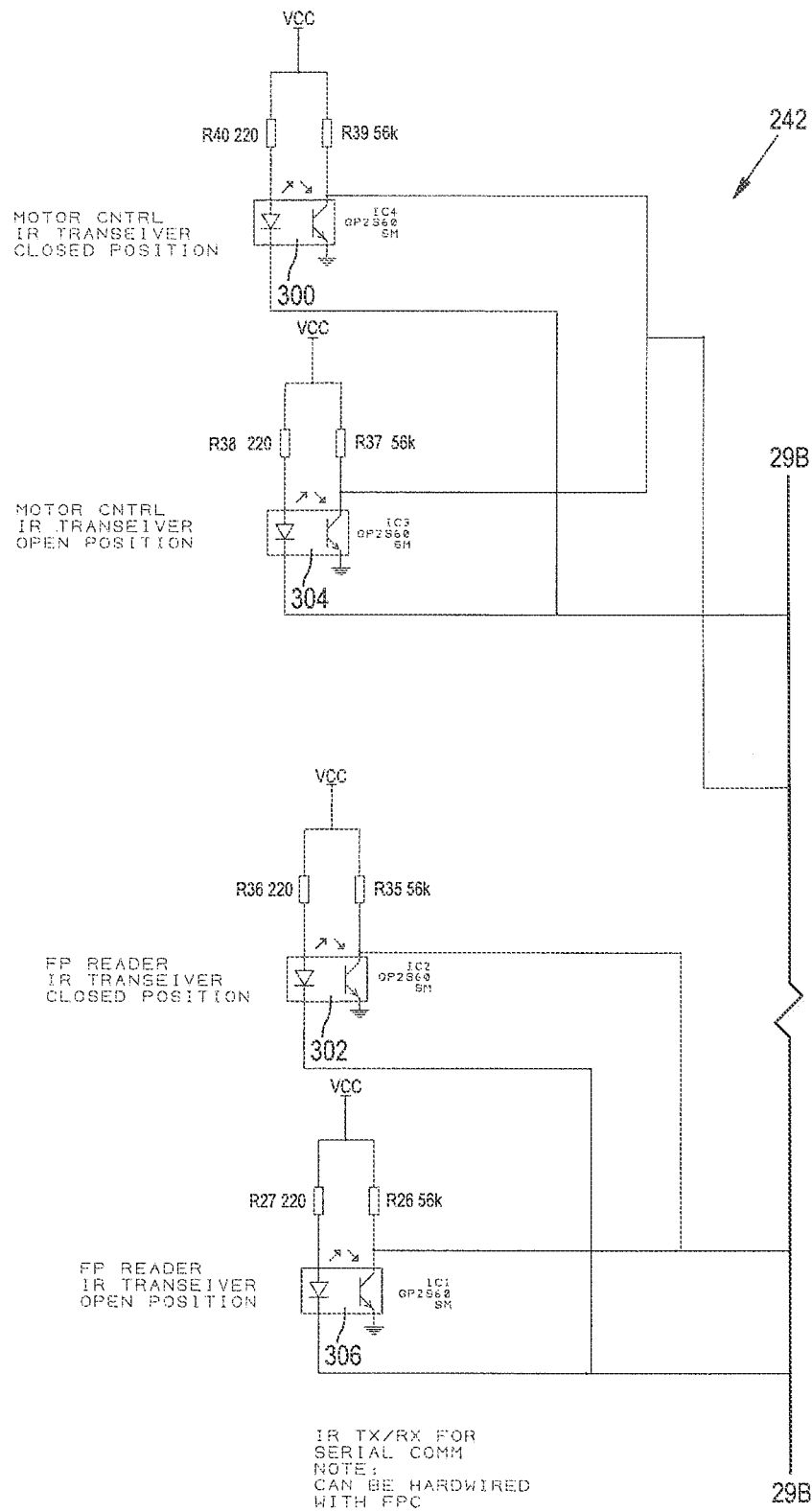
FIGS. 29A-29B are circuit diagrams of a host controller subsystem in the preferred embodiment of the present invention.
Figure 29B:
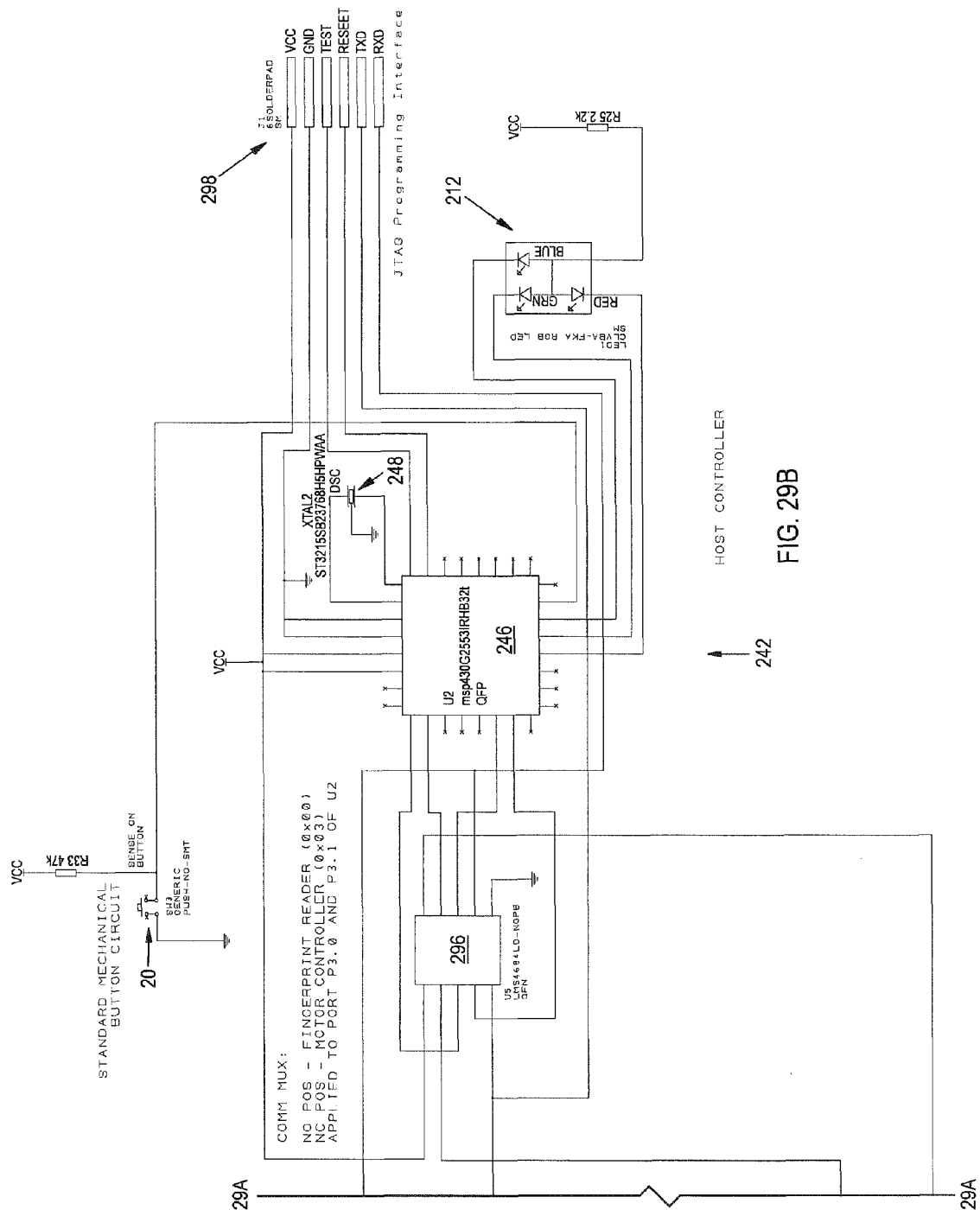

Referring to FIG. 29A-29B, the host controller subsystem 242 secured to the first sidemember 38 in this embodiment is shown in a circuit diagram including the microcontroller 246, the oscillator 248, a multiplexer 296, the light source 212, and the control switch 20. The microcontroller 246 may be accessed through a programming interface 298.

The host controller subsystem 242 is in optical communication with the motor controller subsystem 95 through the first and second optical transceivers 218c, 218d (shown in FIG. 11). In this embodiment, each optical transceiver 218c, 218d, is actually a monolithic pair of transceivers. Thus, as shown in FIG. 29A the first optical transceiver 218c (shown in FIG. 11) includes a first transceiver component 300 and a second transceiver component 302; whereas the second optical transceiver 218d (shown in FIG. 11) includes a first transceiver component 304 and a second transceiver component 306.

Communication from the host controller subsystem 242 through the optical transceivers 218c, 218d is in the form of serial commands with paired responses that are transferred between the host controller subsystem 242 and the receiving communication device. The serial commands employ serial frame addressing techniques which instruct whether the motor controller subsystem 95 or the fingerprint reader subsystem 18 is to act on the command. Additionally, the communication to and from the host controller subsystem 242 is multiplexed into two channels according to whether the communication is directed to the motor controller subsystem 95 or the fingerprint reader subsystem 18. In the first optical transceiver 218c, the first transceiver component 300 optically communicates with optical transceiver 100a from the motor controller subsystem 95 whereas the second transceiver component 302 communicates with the fingerprint reader subsystem 18 when the cover assembly 14 is in the locked position. With the second optical transceiver 218d, the first transceiver component 304 optically communicates with motor controller subsystem 95 whereas the second transceiver component 306 communicates with the fingerprint reader subsystem 18 when the cover assembly 14 is in the unlocked position.

The microcontroller 246 is electrically connected to the light source 212 and the control switch 20. As previously noted, both the light source 212 and the control switch 20 are physically on the second sidemember 40 in this embodiment and are connected through the power cord aperture 198 in the bridge 158. Also extending through the power cord aperture 198 is an electrical connection for power to the fingerprint reader subsystem 18 (not shown).

Figure 30:
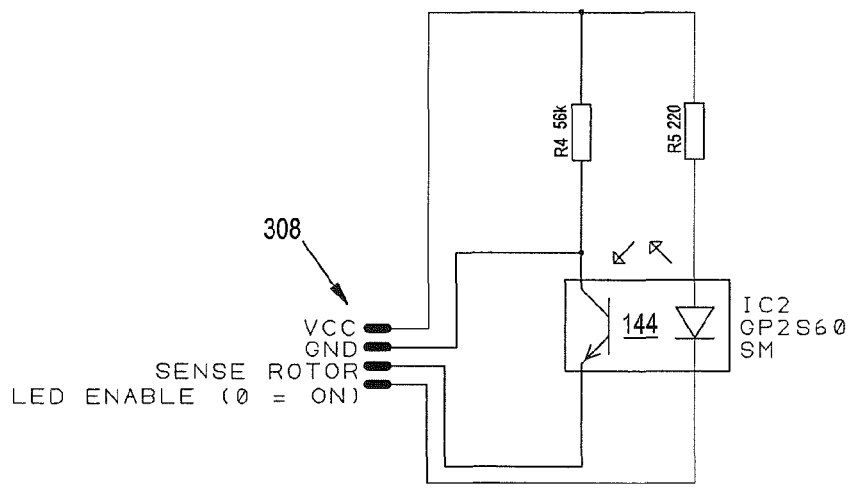
FIG. 30 is a circuit diagram of a reflex sensor used as a position sensor in the preferred embodiment of the present invention.

Referring to FIG. 30, the position sensor 144 that is electrically connected to the motor controller subsystem 95 is shown in a circuit diagram. A break 308 in the connection is shown for illustration purposes. In practice, break 308 and break 294 in FIG. 28 actually form a continuous wired connection that is routed through the sensor compartment 142 and the communication aperture 134c discussed above.

Figure 31A:
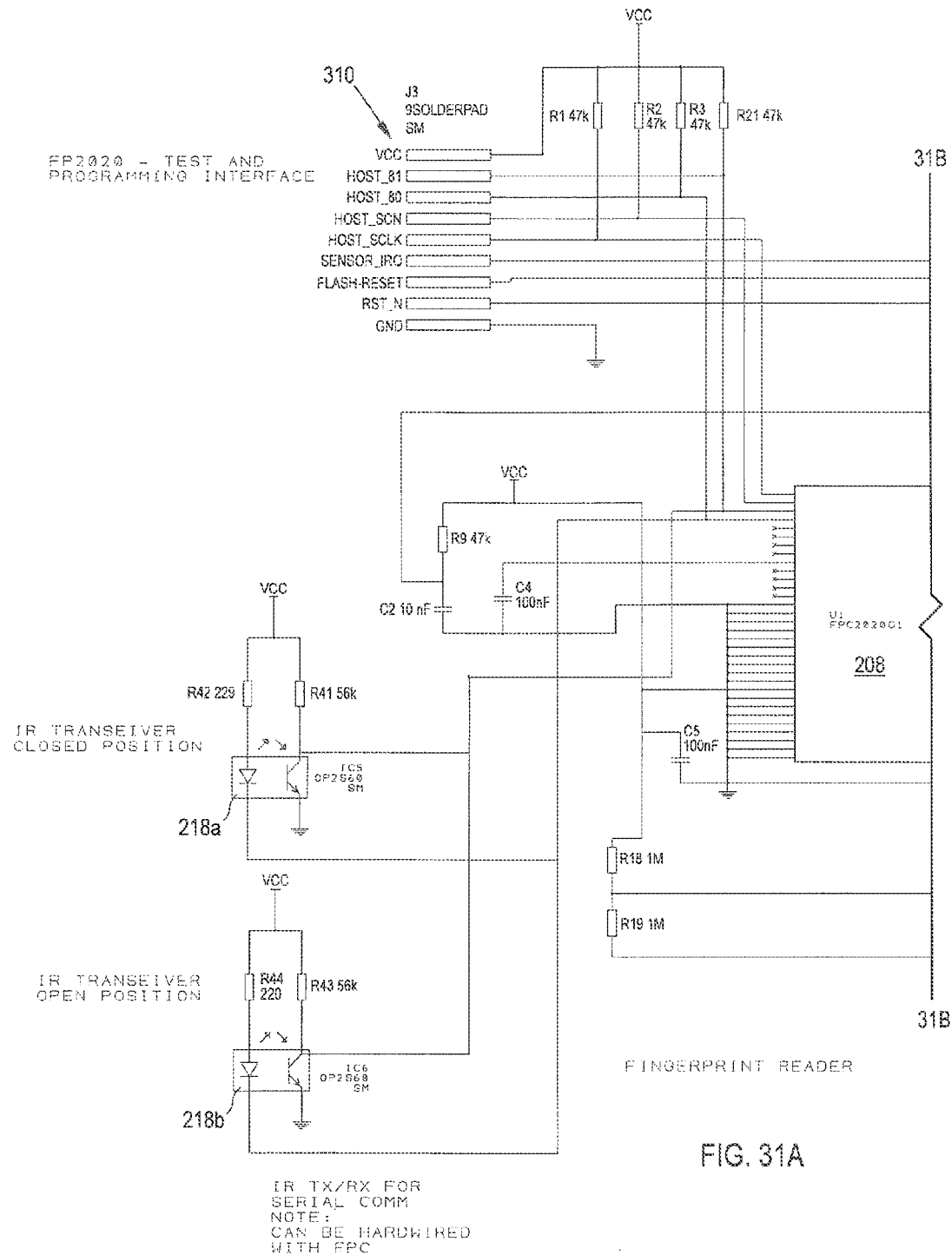
FIGS. 31A-31B are circuit diagrams of a fingerprint reader subsystem in the preferred embodiment of the present invention.
Figure 31B:
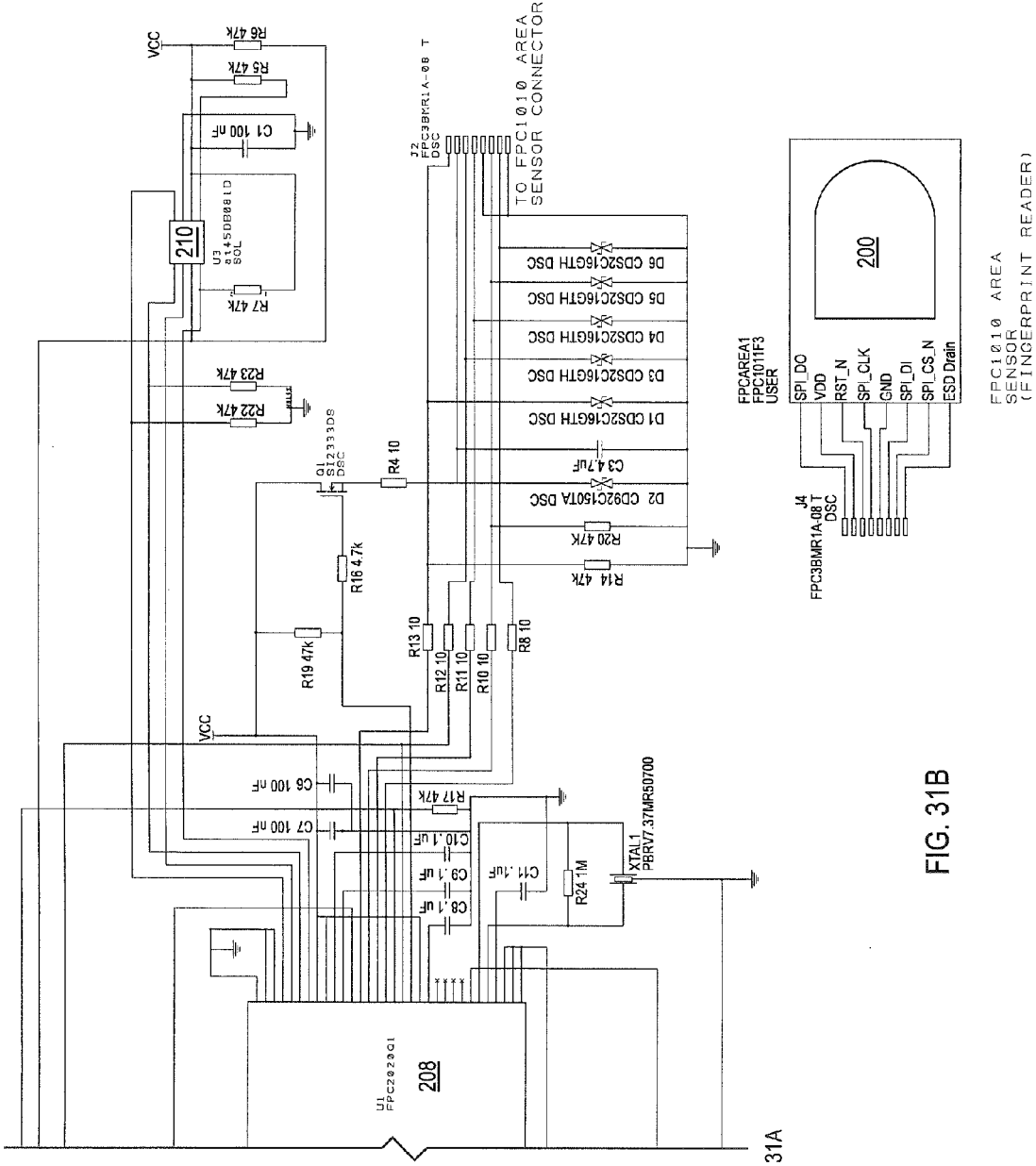

Referring to FIGS. 31A-31B, the fingerprint reader subsystem 18 secured to the second sidemember 40 in this embodiment is shown in a circuit diagram that includes the biometric processor ASIC 208, the data storage component 210, the fingerprint sensor 200, and the first and second optical transceivers 218a, 218b. The biometric processor ASIC 208 may be accessed through a programming interface 310.

Optical transceivers 218a and 218b (shown in FIG. 2) communicate with the optical transceiver 100y that is secured to the second side of the housing body 46 as discussed above. Communication travels through communication aperture 134c in the housing body 46 and an optical signal is emitted from the optical transceiver 100x on the first side of the housing body 46. The optical signal from optical transceiver 100x is then received by the host controller subsystem 242, which issues commands depending upon the signal received.

Hereinafter, the figures may refer to the host controller subsystem as "host" or "host controller"; may refer to the motor controller subsystem 95 as "motor controller"; and, may refer to the fingerprint reader subsystem 18 as "fingerprint processor."

Figure 32:
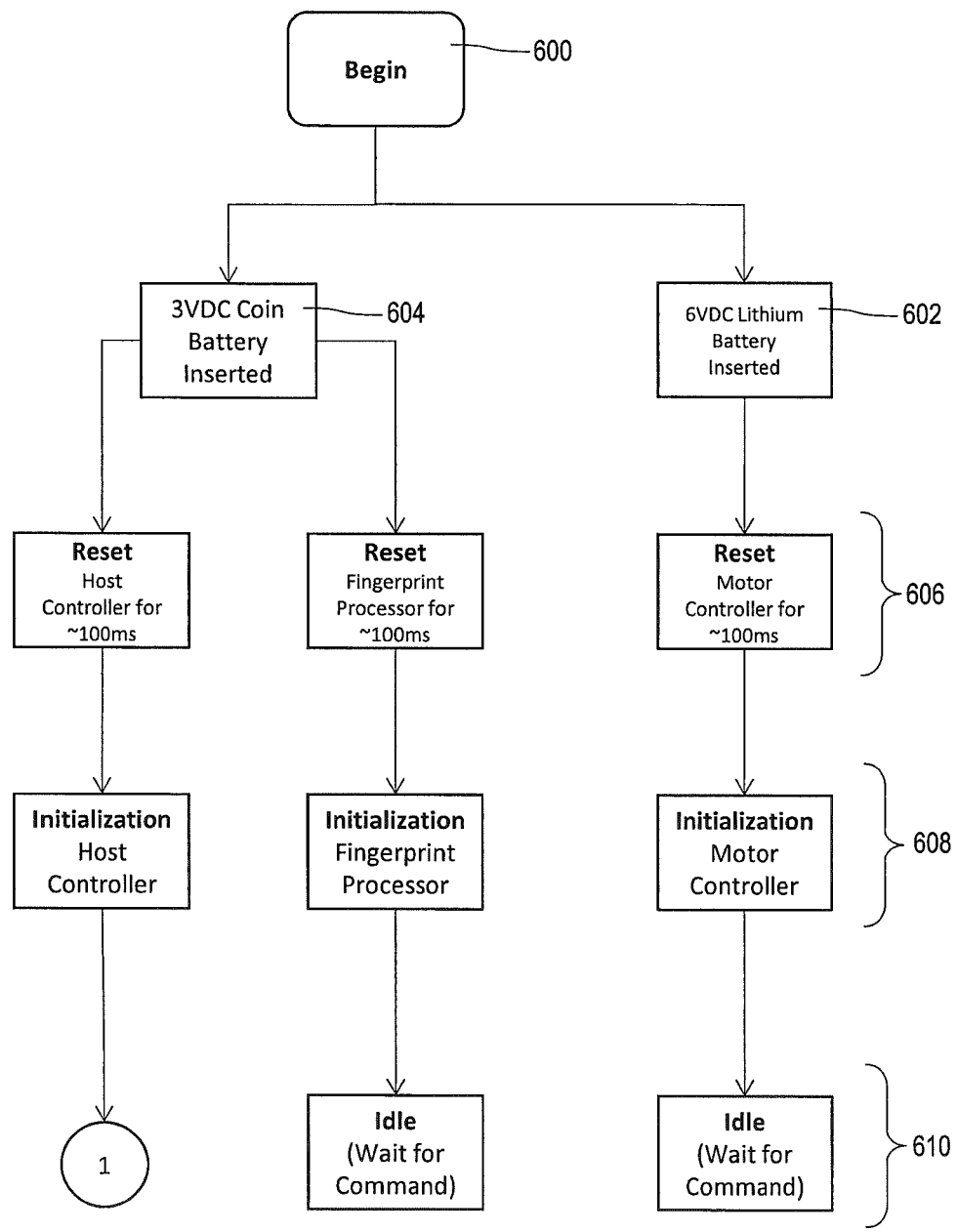
FIGS. 32-42 are a flowchart showing a method of operation for the preferred embodiment of the present invention.

Referring to FIG. 32, the electrical systems execute a power on self-test (POST) including a hardware reset and an initialization. Beginning at step 600, batteries are installed in their respective locations on the trigger lock 10 in steps 602 and 604. In step 602, a six-volt lithium battery is installed within the lock housing assembly 28. In step 604, a three-volt coin battery is installed within the cover assembly 14. Once power is applied, the host controller subsystem 242, the motor controller subsystem 95, and fingerprint reader subsystem 18 each independently execute a hardware reset for approximately one hundred milliseconds, as shown generally in step 606.

After the hardware reset, the host controller subsystem 242, the motor controller subsystem 95, and the fingerprint reader subsystem 18 initialize their respective hardware as generally shown by step 608. Firmware programmed into the respective subsystems directs the initialization and beginning of operation for the subsystems. The firmware directs the motor controller subsystem 95 and fingerprint reader subsystem 18 to enter an idle mode and wait for a command sequence, as generally shown by step 610, while the host controller subsystem 242 continues executing commands to begin operation.

Figure 33:
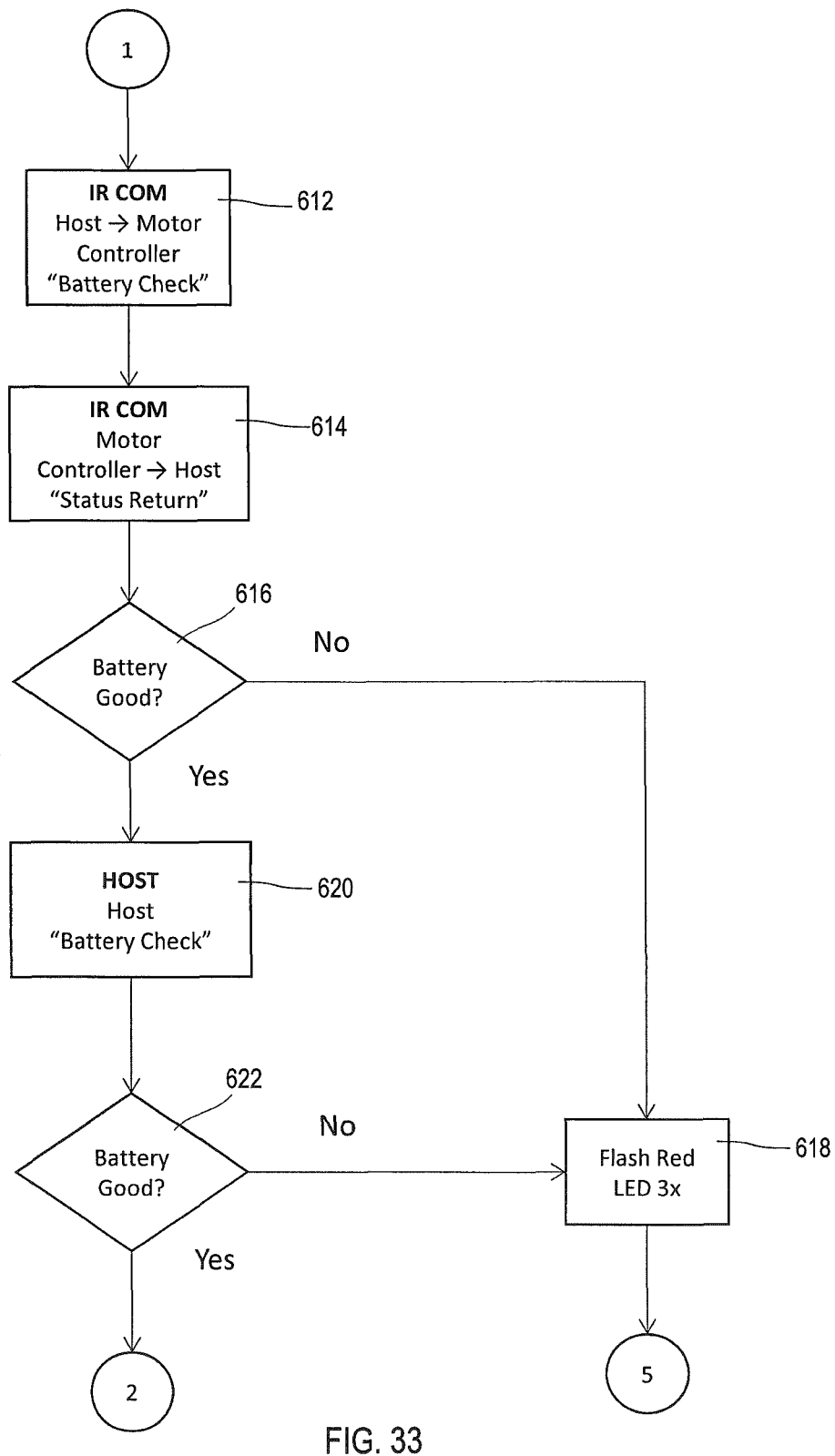

Referring to FIG. 33, the host controller subsystem 242 executes a battery check. It first checks the six-volt battery within the lock housing assembly 28 (i.e., the "motor battery") by issuing a voltage-check command to the motor microcontroller 98 as shown in step 612. Once the voltage-check command is received by the motor controller subsystem 95, the Supply Voltage Supervisor (hereafter, SVS) flag is checked for a low voltage (e.g., less than 3.05 VDC) on the analog voltage supply pin of the motor microcontroller 98. Since the analog and digital voltage supply pins are tied together, the output (VOUT) of the voltage regulator 290 can be monitored with the minimum of additional components and flag voltage level threshold can be set by the appropriate SVS register (VLDx).

In step 614, motor controller subsystem 95 sends a status return to the host controller subsystem 242. The microcontroller 246 receives the communication and in step 616 assesses the appropriate command response. If the voltage is insufficient, the microcontroller 246 commands the light source 212 to flash the red LED three times, as shown in step 618, and issues a command to all the subsystems (including a command to the host controller subsystem 242) to enter into a low power mode (i.e., "sleep mode"), as discussed with reference to FIG. 41 below.

If voltage from the motor battery is sufficient, the host controller subsystem 242 performs a voltage check on the three-volt battery 250, as shown in step 620. The SVS flag on the microcontroller 246 is checked for a low voltage (e.g., less than 3.05 VDC) on the analog voltage supply pin of the microcontroller 246, as shown in step 622. Since the analog and digital voltage supply pins are tied together, the battery 250 positive terminal can be monitored with the minimum of additional components and flag voltage can be set by setting the appropriate SVS register (VLDx). If the voltage is insufficient, the microcontroller 246 commands the light source 212 to flash the red LED three times, as shown in step 618, and issues a command to all the subsystems (including the host controller subsystem 242) to enter sleep mode. If the voltage for both batteries is sufficient, the host controller subsystem 242 proceeds to check the hardware of the fingerprint reader subsystem 18.

Figure 34:
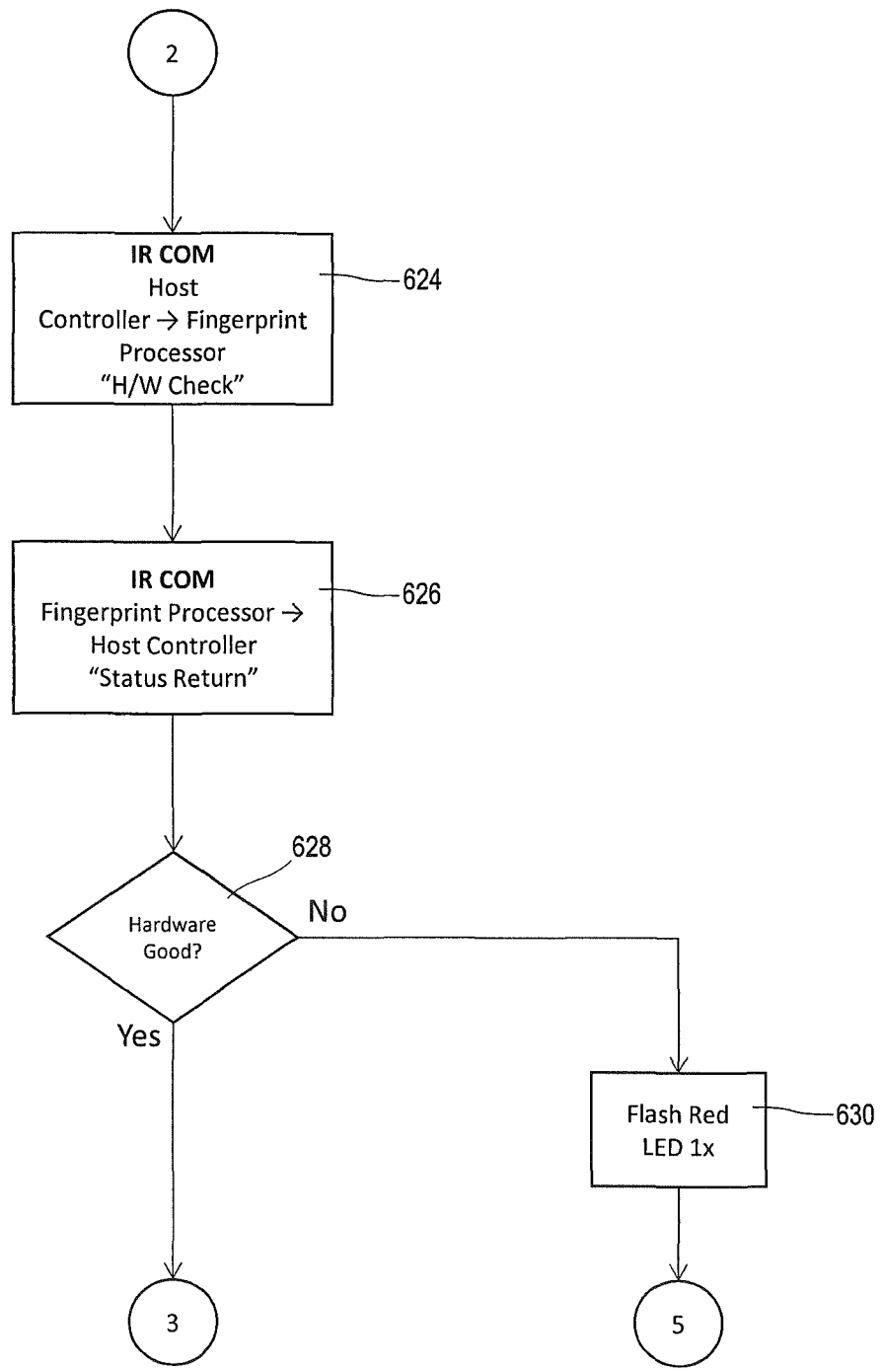

In FIG. 34, the host controller subsystem 242 directs the fingerprint reader subsystem 18 to perform a hardware check. In step 624, the host controller subsystem 242 issues a hardware check command to the fingerprint reader subsystem 18 and waits for a response. The main purpose of this command is to determine if the firmware is running properly, to test communication with the information storage component, to verify internal memory of the biometric processor 208 is working correctly, to check connection to the fingerprint sensor 200, to test the fingerprint reader reset, and to test the fingerprint sensor 200 chip select. After the fingerprint reader subsystem 18 executes these tests, it communicates to the host controller subsystem 242 an appropriate response depending on the outcome of the tests, as shown in step 626.

Upon receipt of the response from the fingerprint processor subsystem 18, the host controller subsystem 242 determines the next operation, as shown in step 628. If the fingerprint subsystem 18 fails the hardware check, the microcontroller 246 commands the light source 212 to flash the red LED once, as shown by step 630. Additionally, the microcontroller 246 issues a command to all the subsystems to enter sleep mode.

Figure 35:
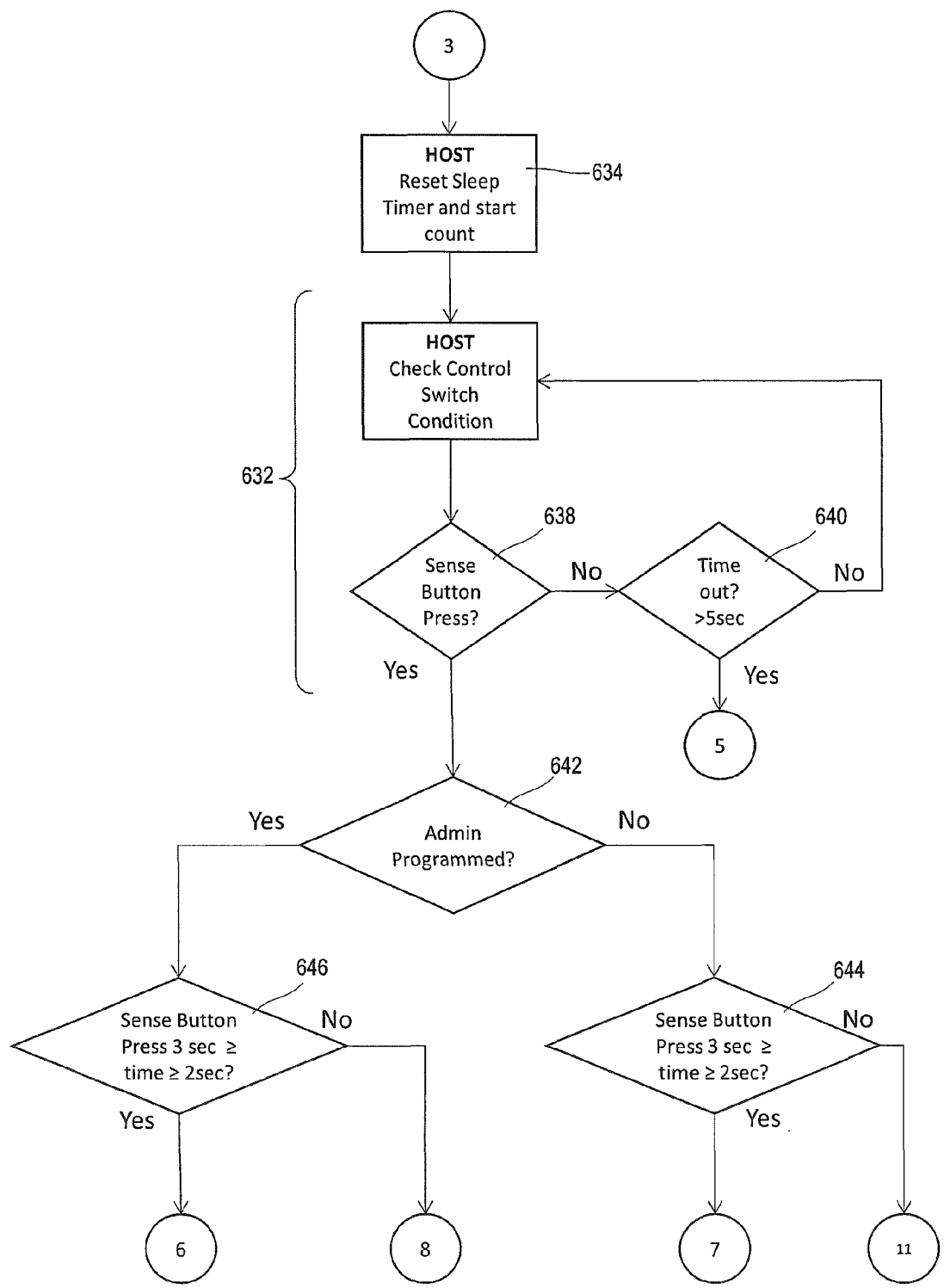

Referring to FIG. 35, coming from the POST operation or from sleep mode, the host controller subsystem 242 uses an interrupt service routine 632 to sense whether the control switch 20 has been activated (e.g., pressed). The timer in the microcontroller 246 is reset and begins counting toward a specified time period limit (e.g., five seconds), as shown in step 634. In step 638 the microcontroller 246 assesses whether the control switch 20 has been activated. If not, the microcontroller 246 assesses whether the specified time period limit has been exceeded (e.g., greater than five seconds), as shown by step 640. If the specified time period limit has been exceeded, the microcontroller 246 issues a command to all the subsystems to enter sleep mode. If the time period limit has not been exceeded the interrupt service routine 632 continues. If the control switch 20 is activated before the specified time period is exceeded, the timer is instructed to hold count and will not be enabled until a function(s) re-enables it.

If activation of the control switch 20 is detected in step 638, the host controller subsystem 242 assesses whether an administrator has been programmed into the trigger lock 10, as shown by step 642. To make this assessment, the host controller subsystem 242 communicates with the fingerprint reader subsystem 18, where the administrator information is stored.

If an administrator has not been programmed, the host controller subsystem 242 then determines the next action depending on the time period that the control switch 20 was activated during the interrupt service routine 636, as shown in step 644. If the control switch 20 was activated for a time period greater than or equal to a first time period limit (e.g., two seconds) AND less than or equal to second time period limit (e.g., 3 seconds), the host controller subsystem 242 proceeds to capture and enroll an initial administrator, as discussed with reference to FIG. 36 below. If the control switch 20 was not activated for a time period within the first and second time period limits, the host controller subsystem 242 proceeds to a testing mode, as discussed with reference to FIG. 42 below.

If an administrator has been programmed into the trigger lock 10, in step 646, the host controller subsystem 242 determines the next action depending on the time period that the control switch 20 was activated during the interrupt service routine 636. If the control switch 20 was activated for a time period greater than or equal to a first time period limit (e.g., two seconds) AND less than or equal to a second time period limit (e.g., three seconds), the host controller subsystem 242 proceeds to capture and enroll a replacement, as discussed with reference to FIG. 37 below. If the control switch 20 has was not activated for a time period within the first and second time period limits, the host controller subsystem 242 proceeds to verify whether the cover assembly 14 is in the locked or unlocked position, as discussed with reference to FIG. 38 below.

Figure 36:
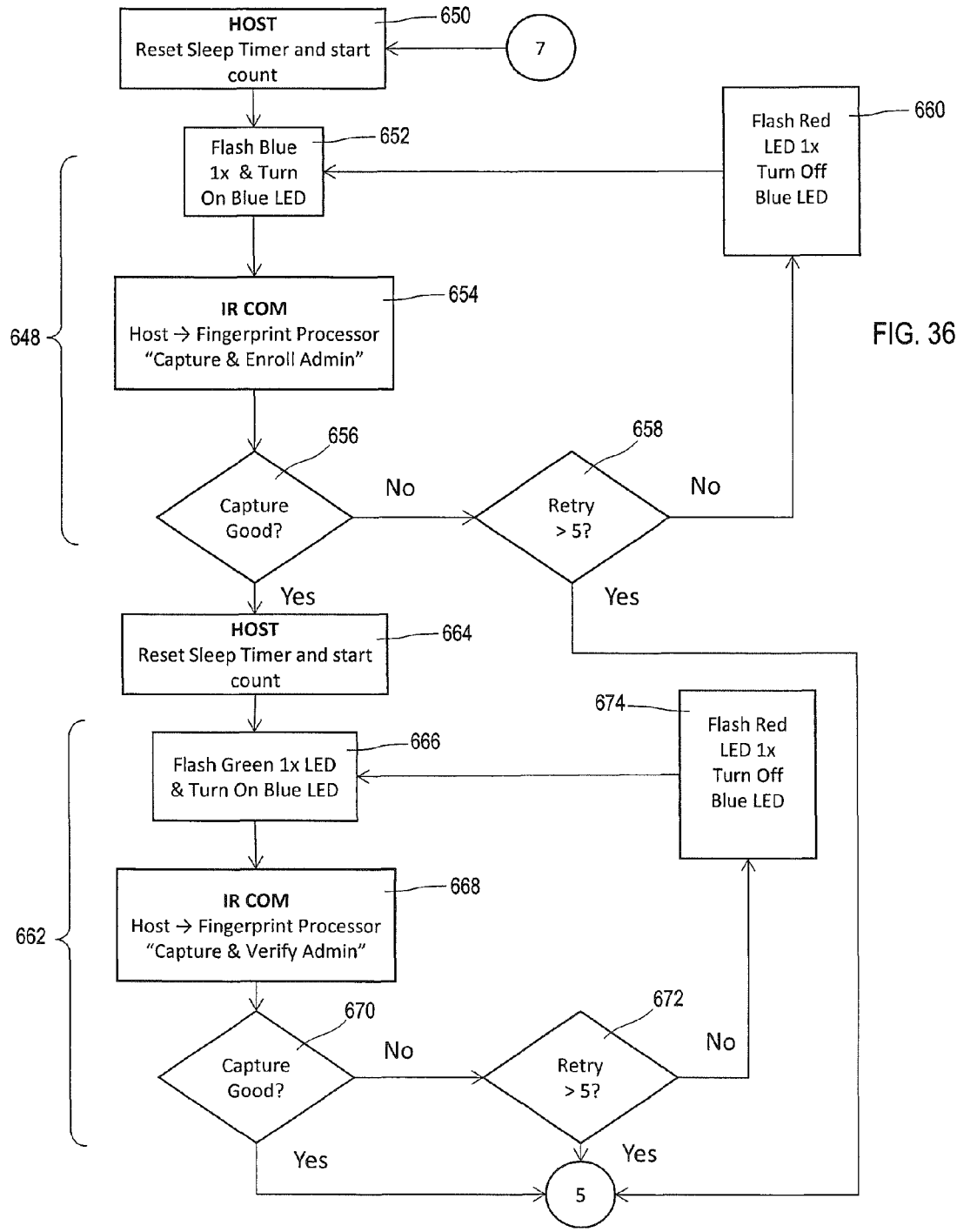

Referring to FIG. 36, the host controller subsystem 242 captures and enrolls an initial administrator using an interrupt service routine 648. The timer in the microcontroller 246 is reset and begins counting toward a specified time period limit (e.g., five seconds), as shown in step 650. Next, the microcontroller 246 commands the light source 212 to flash the blue LED once and illuminate a solid blue light, as shown in step 652. The host controller subsystem 242 then issues a "Capture & Enroll Admin" command that is communicated to the fingerprint controller subsystem 18 and waits for a finger to be placed on the fingerprint sensor 200, as shown in step 654. Next, the microcontroller 246 assesses whether a fingerprint has been captured and enrolled into memory, as shown by step 656. If not, the microcontroller 246 assesses whether the specified time period limit has been exceeded (e.g., greater than five seconds), as shown by step 658. If the specified time period limit has been exceeded, the microcontroller 246 cancels the interrupt service routine 648 and issues a command to all the subsystems to enter sleep mode. If the time period limit has not been exceeded, the microcontroller 246 commands the light source 212 to turn off the blue LED and flash the red LED once, as shown by step 660, and the interrupt service routine 648 continues.

If a good fingerprint capture is detected in step 656, the host controller subsystem 242 uses an interrupt service routine 662 to verify that the administrator fingerprint will function as intended. The timer in the microcontroller 246 is reset and begins counting toward a specified time period limit (e.g., five seconds), as shown in step 664. Next, the microcontroller 246 commands the light source 212 to flash the green LED once and illuminate a solid blue light, as shown in step 666. The host controller subsystem 242 then issues a "Capture and Verify" command that is communicated to the fingerprint controller subsystem 18 and waits for a finger to be placed on the fingerprint sensor 200, as shown in step 668. Next, the microcontroller 246 assesses whether a fingerprint has been captured and, if so, whether the captured fingerprint matches the administrator fingerprint enrolled in memory, as shown by step 670. If not, the microcontroller 246 assesses whether the specified time period limit has been exceeded (e.g., greater than five seconds), as shown by step 672. If the specified time period limit has been exceeded, the microcontroller 246 cancels the interrupt service routine 662 and issues a command to all the subsystems to enter sleep mode. If the time period limit has not been exceeded, the microcontroller 246 commands the light source 212 to turn off the blue LED and flash the red LED once, as shown by step 674, and the interrupt service routine 662 continues.

Figure 37:
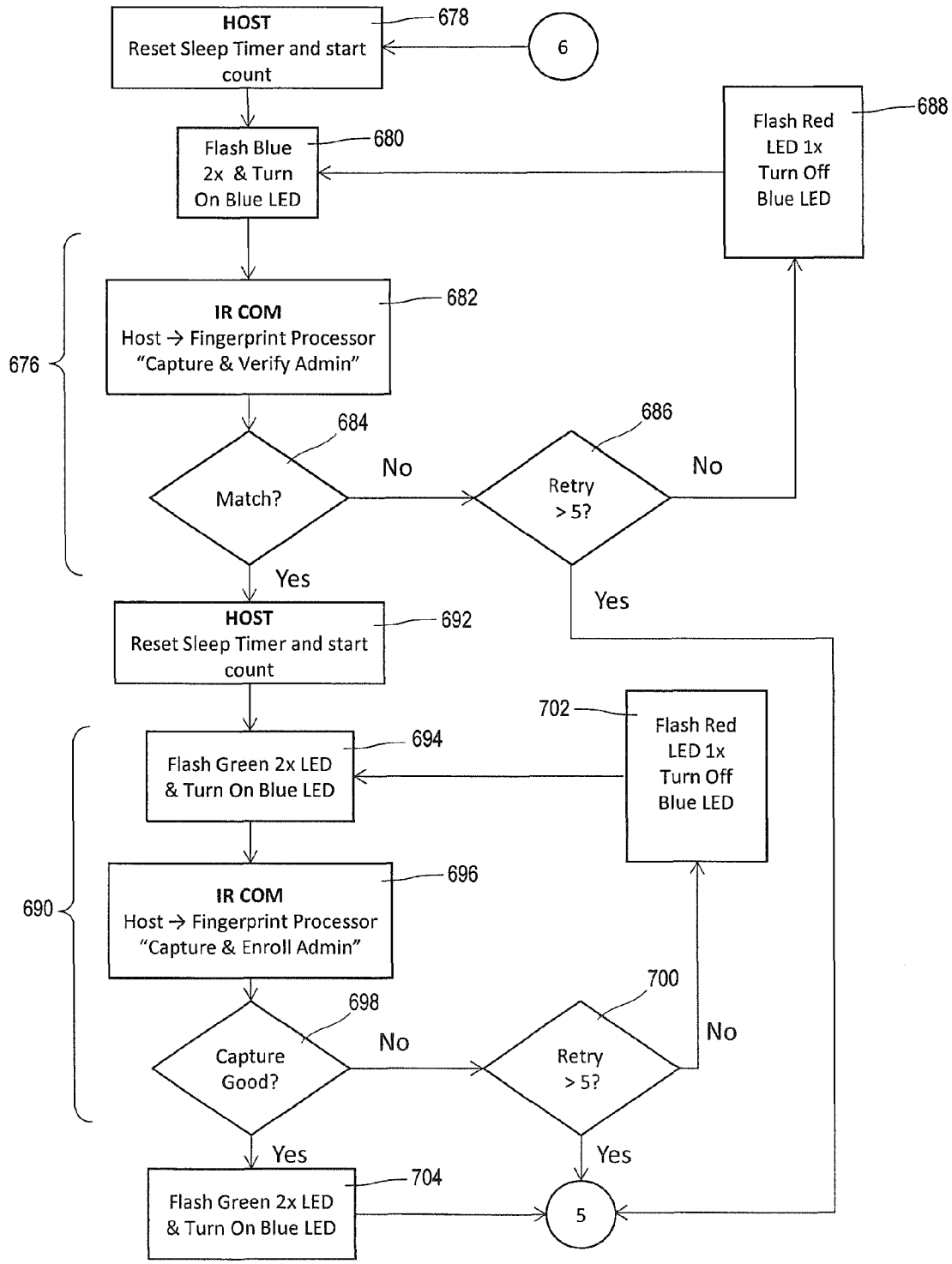

Referring now to FIG. 37, the host controller subsystem 242 changes the administrator programmed into the trigger lock 10 using an interrupt service routine 676. The timer in the microcontroller 246 is reset and begins counting toward a specified time period limit (e.g., five seconds), as shown in step 678. Next, the microcontroller 246 commands the light source 212 to flash the blue LED twice and illuminate a solid blue light, as shown in step 680. The host controller subsystem 18 then issues a "Capture and Verify" command that is communicated to the fingerprint controller subsystem 200 and waits for the current administrator fingerprint to be placed on the fingerprint sensor 200, as shown in step 682. Next, the microcontroller 246 assesses whether the fingerprint placed on the sensor 200 matches the administrator fingerprint enrolled in memory, as shown by step 684. If not, the microcontroller 246 assesses whether the specified time period limit has been exceeded (e.g., greater than five seconds), as shown by step 686. If the specified time period limit has been exceeded, the microcontroller 246 cancels the interrupt service routine 676 and issues a command to all the subsystems to enter sleep mode. If the time period limit has not been exceeded, the microcontroller 246 commands the light source 212 to turn off the blue LED and flash the red LED once, as shown by step 688, and the interrupt service routine 676 continues.

If a good fingerprint capture is detected in step 684, the host controller subsystem 242 uses an interrupt service routine 690 to enroll a new administrator. The timer in the microcontroller 246 is reset and begins counting toward a specified time period limit (e.g., five seconds), as shown in step 692. Next, the microcontroller 246 commands the light source 212 to flash the green LED twice and illuminate a solid blue light, as shown in step 694. The host controller subsystem 242 then issues a "Capture & Enroll Admin" command that is communicated to the fingerprint controller subsystem 18 and waits for a finger to be placed on the fingerprint sensor 200, as shown in step 696.

Next, the microcontroller 246 assesses whether a fingerprint has been captured and enrolled into memory, as shown by step 698. If not, the microcontroller 246 assesses whether the specified time period limit has been exceeded (e.g., greater than five seconds), as shown by step 700. If the specified time period limit has been exceeded, the microcontroller 246 cancels the interrupt service routine 690 and issues a command to all the subsystems to enter sleep mode. If the time period limit has not been exceeded the microcontroller 246 commands the light source 212 to turn off the blue LED and flash the red LED once, as shown by step 702, and the interrupt service routine 690 continues. If a good fingerprint capture is detected in step 698, the microcontroller 246 commands the light source 212 to flash the green LED twice and illuminate a solid blue light, as shown by step 704, and issues a command to all the subsystems to enter sleep mode.

Figure 38:
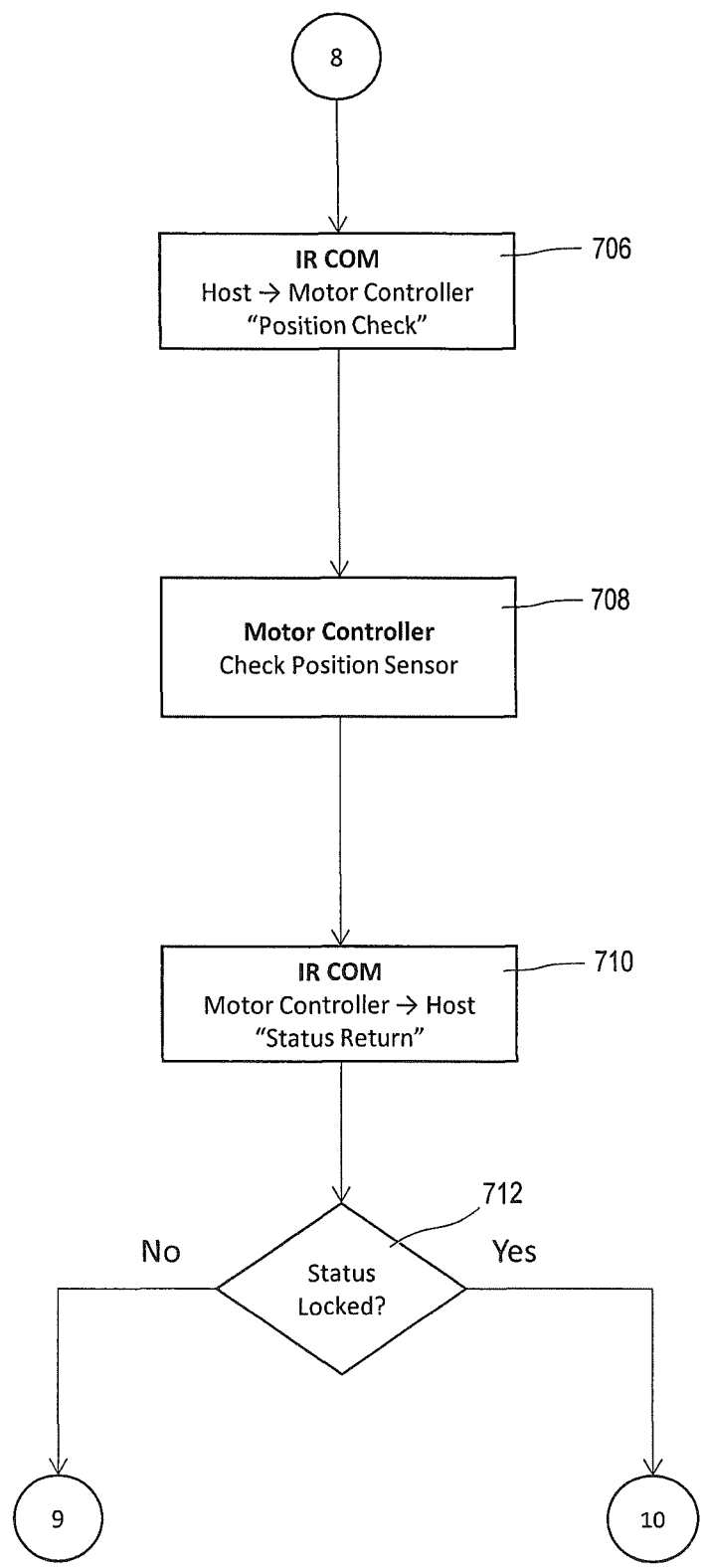

Referring to FIG. 38, the host controller subsystem 242 determines whether the cover assembly 14 is in the locked or unlocked position. The host controller subsystem 242 issues a "Slide Position Check" command that is communicated to the motor controller subsystem 95, as shown in step 706. The motor controller subsystem 95 then commands the position sensor 144 to check the position of the lock rotor 76, as shown by step 708. The motor controller subsystem 95 then communicates the position of the lock rotor 76—and thus the position of the cover assembly 14 to the host controller subsystem 242, as shown in step 710. The host controller subsystem 242 then assesses whether the cover assembly 14 is in the locked position based upon the information from the motor controller subsystem 95, as shown by step 712. If the cover assembly 14 is not in the locked position, the host controller subsystem 242 will proceed to a locking sequence, as discussed with reference FIG. 39 below. If the cover assembly 14 is in the locked position, the host controller subsystem 242 will proceed to determine whether an authorized person is attempting to unlock the firearm, as discussed with reference FIG. 40 below.

Figure 39:
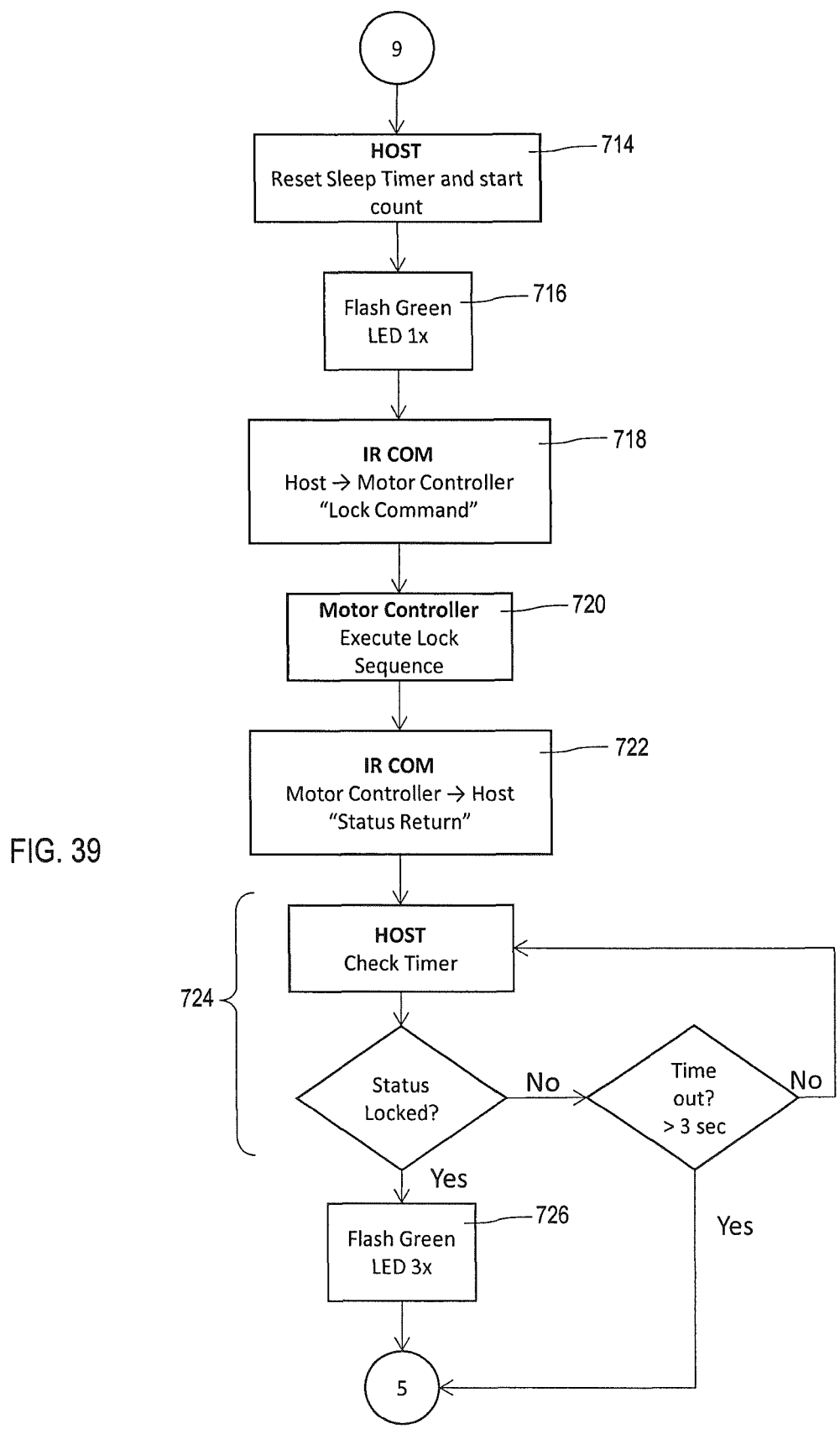

Referring to FIG. 39, the host controller subsystem 18 attempts a locking sequence to lock the cover assembly 14 in the locked position. The timer in the microcontroller 246 is reset and will begin counting toward a specified time period limit (e.g., three seconds), as shown in step 714. Next, the microcontroller 746 commands the light source 212 to flash the green LED once, as shown by step 716. The host controller subsystem 242 then issues a "Lock Cover Assembly" command that is communicated to the motor controller subsystem 95, as shown in step 718.

In step 720, the motor controller subsystem 95 attempts to execute a locking sequence, which will be successful if the cover assembly 14 has been pulled to the locked position and unsuccessful if not. During this step, the motor controller subsystem 18 executes interrupt-driven power cycling to the motor 70 while polling the position sensor 144. As the motor controller subsystem 95 also attempts rotate the lock rotor 76, it attempts to communicate the status of the lock rotor 76 to the host controller subsystem 242 while the cover assembly 14 is being pulled to the locked position. Once in the locked position the motor controller subsystem 95 achieves optical communication with the host controller subsystem 242, as shown in step 722, and informs the host controller subsystem 242 whether the locking operation was successful based upon polling of the position sensor 144.

Upon receiving communication from the motor controller subsystem 95, the host controller 242 uses an interrupt service routine 724 to determine whether the locking operation has occurred within a specified time period limit (e.g., within three seconds). If not, the microcontroller 246 cancels the interrupt service routine 724 and issues a command to all the subsystems to enter sleep mode. Further, if the host controller subsystem 242 does not receive optical communication from the motor controller subsystem 95 within the specified time period (e.g., the cover assembly 14 gets stuck), the microcontroller 746 cancels the interrupt service routine 724 and issues a command to all the subsystems to enter sleep mode. If the locking operation is successful, the microcontroller 246 commands the light source 212 to flash the green LED three times, as shown by step 726, and issues a command to all the subsystems to enter sleep mode.

Figure 40:
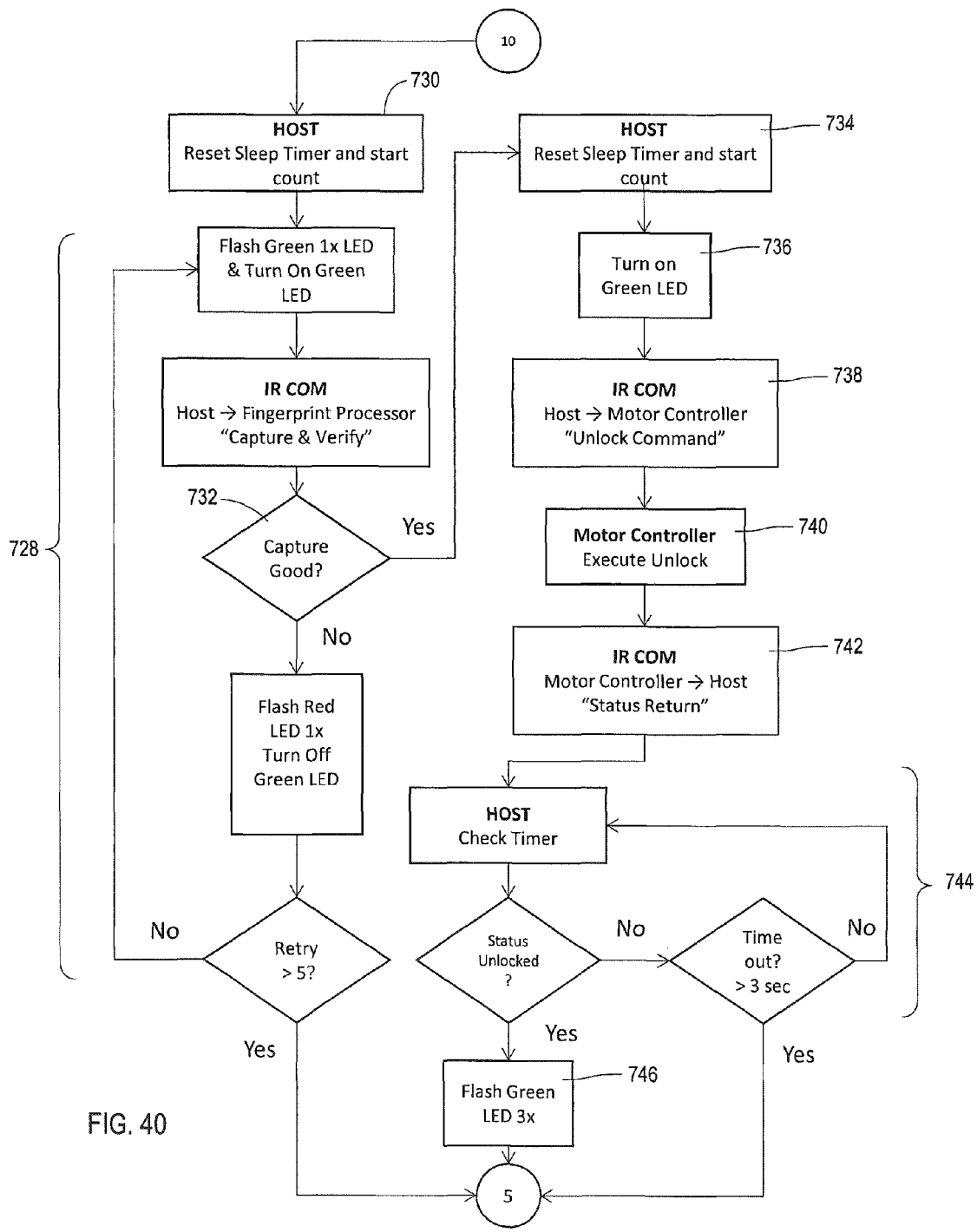

Referring to FIG. 40, the host controller subsystem 242 attempts an unlock sequence using an interrupt service routine 728. The timer in the microcontroller 246 is reset and begins counting toward a specified time period limit (e.g., five seconds), as shown in step 730. The host controller subsystem then proceeds to the interrupt service routine 728. Interrupt service routine 728 is largely similar to the interrupt service routines used to capture and verify an administrator's fingerprint (e.g., interrupt service routine 662 in FIG. 36); however the present interrupt service routine 728 determines whether the fingerprint presented matches that of an authorized person (i.e., anyone with authority to unlock the device rather than an administrator), as shown in step 732. Additionally, the present interrupt service routine 728 employ different light signals from the light source 212 than those described previously, as shown by the applicable text entries in FIG. 40.

If the interrupt service routine 728 determines that the fingerprint of an authorized person has not been presented within the applicable time period limit, the microcontroller 246 cancels the interrupt service routine 728 and issues a command to all the subsystems to enter sleep mode, as discussed with reference to FIG. 41 below. If the interrupt service routine 728 determines that the fingerprint of an authorized person is presented within the applicable time period limit, host controller subsystem 242 begins an unlocking sequence.

The unlock sequence begins in step 734, where the timer in the microcontroller 246 is reset and begins counting. In step 736, the microcontroller 246 commands the light source 212 to illuminate a solid green light. The host controller subsystem 242 then issues an unlock command that is communicated to the motor controller subsystem 95, as shown in step 738. In step 740, the motor controller subsystem 95 attempts to execute the unlock sequence using interrupt-driven power cycling to the motor 70 while polling the position sensor 144. As the motor controller subsystem 95 attempts rotate the lock rotor 76, it also attempts to communicate the status of the lock rotor 76 to the host controller subsystem 242 while the cover assembly 14 displaces toward the unlocked position. Once in the unlocked position the motor controller subsystem 95 achieves optical communication with the host controller subsystem 242 and it informs the host controller subsystem 242 whether the unlocking operation was successful, as shown in step 742.

Upon receiving communication from the motor controller subsystem 95, the host controller 242 uses an interrupt service routine 744 to determine whether the unlocking operation successfully occurred within a specified time period limit (e.g., within three seconds). If not, the microcontroller 246 cancels the interrupt service routine 744 and issues a command to all the subsystems to enter sleep mode. Further, if the host controller subsystem 242 does not receive optical communication from the motor controller subsystem 95 within the specified time period limit (e.g., the cover assembly 14 gets stuck), the microcontroller 746 cancels the interrupt service routine 744 and issues a command to all the subsystems to enter sleep mode. If the locking operation is successful, the microcontroller 246 commands the light source 212 to flash the green LED three times, as shown by step 746, and issues a command to all the subsystems to enter sleep mode.

Figure 41:
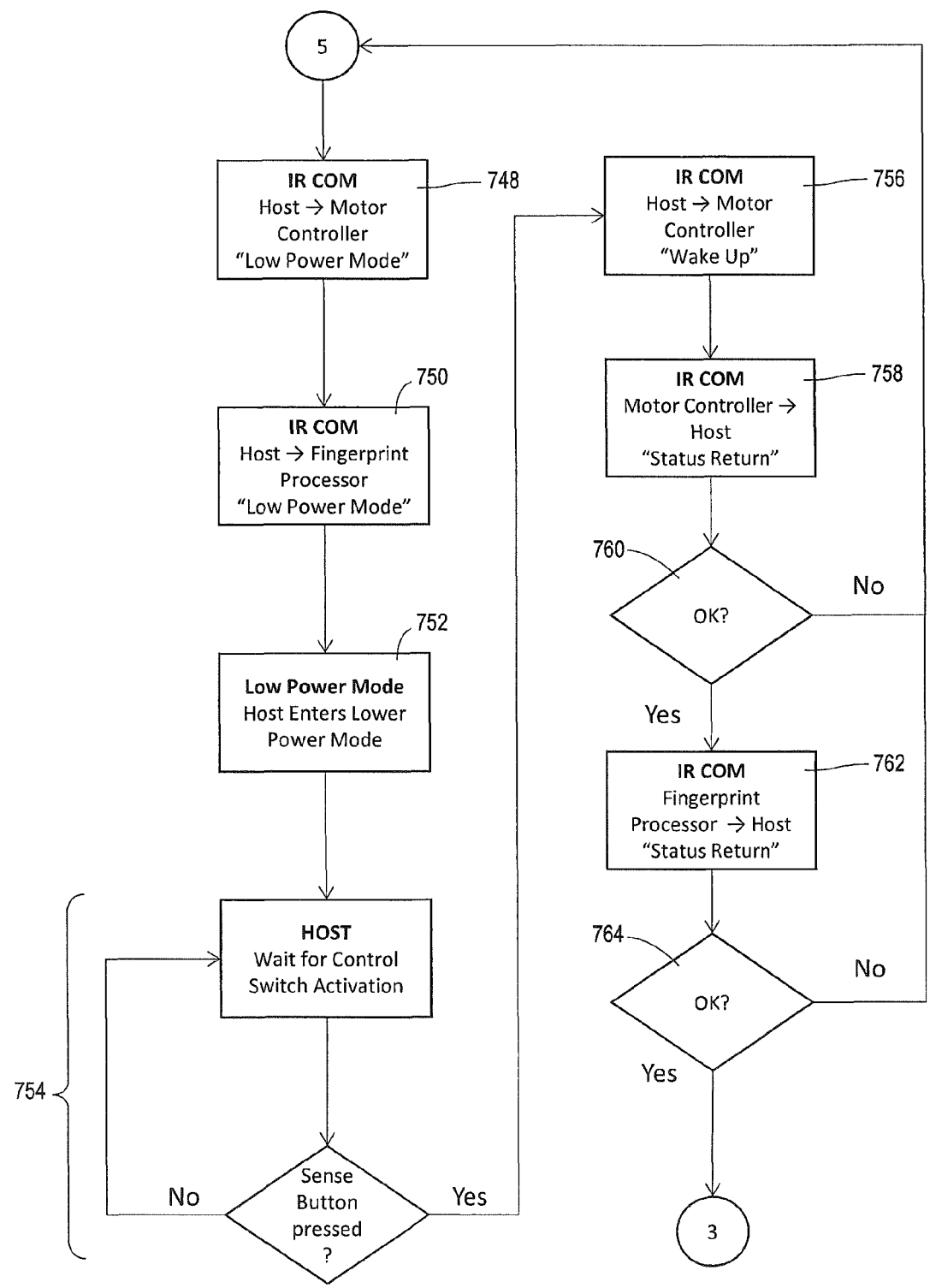

Referring to FIG. 41, execution of sequences for putting the various subsystems into sleep mode and waking the various subsystems from sleep mode are shown. In step 748 the host controller subsystem 242 communicates a command to the motor controller subsystem 95 to enter sleep mode and, in step 750, communicates a command to the fingerprint controller subsystem 18 to enter sleep mode. The host controller subsystem 242 then enters into sleep mode, as shown in step 752.

While in sleep mode, the host controller subsystem 242 performs a continuous interrupt service routine 754 until the control switch 20 is activated. Once the control switch 20 is activated an interrupt occurs and the host controller subsystem 242 communicates a "wake up" command to the motor controller subsystem 95, as shown in step 756. In step 758, the motor controller subsystem 95 communicates a status return message to the host controller subsystem 242. In step 760 the microcontroller 246 determines whether it received a status return message from the motor controller subsystem 95. If not, the microcontroller 246 issues commands to all the subsystems to return to sleep mode. If a status return message is received, the host controller subsystem 242 communicates a "wake up" command to the fingerprint processor subsystem 18 (not shown). In step 762, the fingerprint reader subsystem 18 communicates a status return message to the host controller subsystem 242. In step 764, the host controller subsystem 242 determines whether it received a status return message from the fingerprint reader subsystem 18. If not, the microcontroller 246 issues commands to all the subsystems to return to sleep mode. If a status return message is received, the host controller subsystem 242 proceeds to begin the main program previously discussed.

Figure 42:
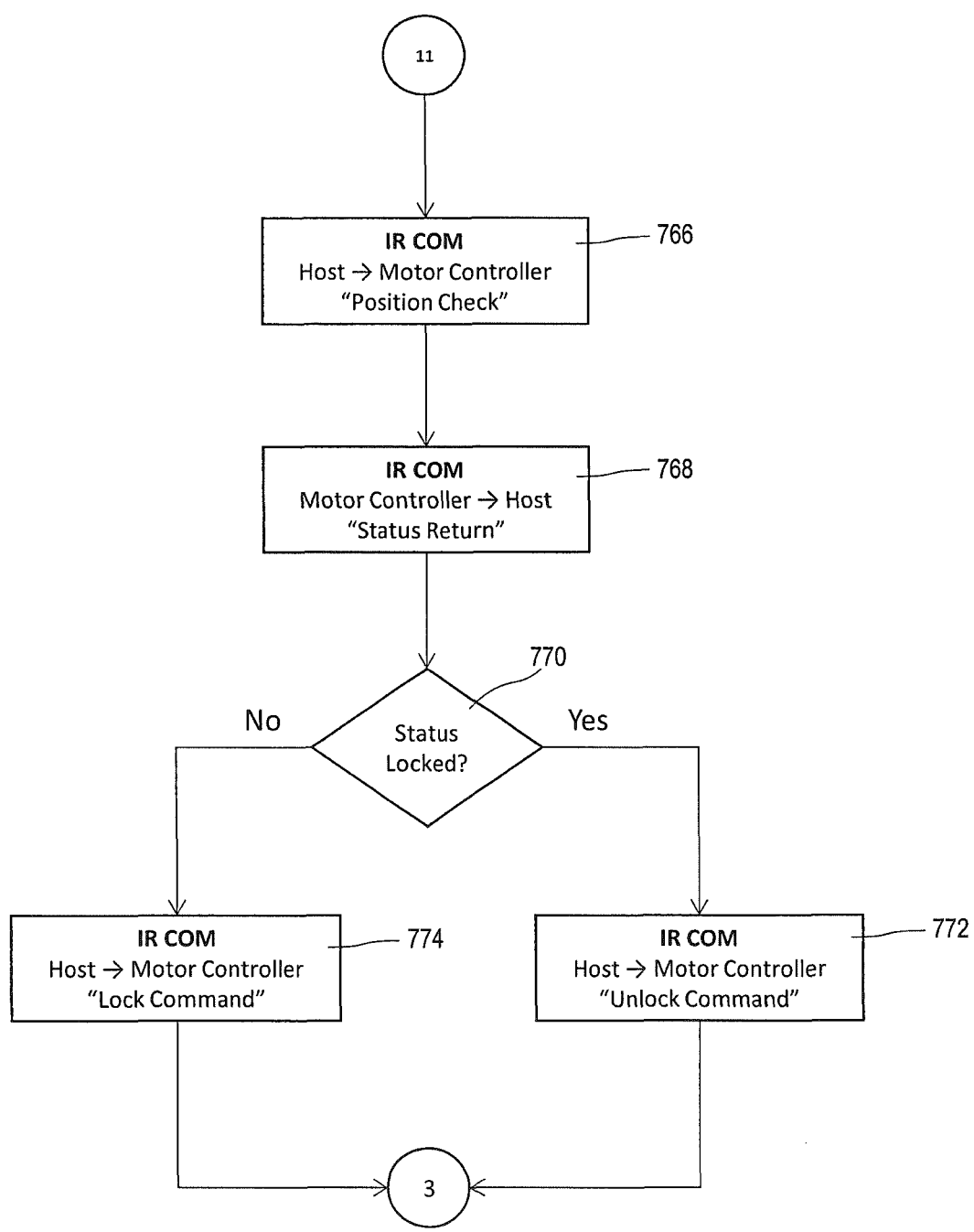

Referring to FIG. 42, the host controller subsystem 242 allows the device to be tested when an administrator is not programmed. In step 766, the host controller subsystem 242 communicates with the motor controller subsystem 95 to determine whether the cover assembly 14 is in the locked or unlocked position. In step 768 the motor controller subsystem 95 determines the position of the cover assembly vis-à-vis the position sensor 144 and communicates the status back to the host controller subsystem 242. The host controller subsystem 242 then assesses whether the cover assembly 14 is in the locked or unlocked position, as shown in step 770. If it is in the locked position, the host controller subsystem 242 communicates an unlock command to the motor controller subsystem 95, as shown in step 772, and proceeds to begin the main program previously discussed. If the cover assembly 14 is in the unlocked position, the host controller subsystem 242 communicates a lock command to the motor controller subsystem 95, as shown in step 774, and proceeds to begin the main program previously discussed.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above description of the invention. It is, therefore, contemplated that the appended claims will cover such modifications that fall within the scope of the invention.

We claim:

1. A method of optical communication within a trigger lock having a cover assembly displaceably mounted to a lock housing assembly, said lock housing assembly being statically mounted to a trigger guard and said cover assembly being displaceable between a locked position and an unlocked position, the method comprising:

aligning an optical transceiver on a first sidemember of the cover assembly with a corresponding optical transceiver on a first side of a housing body of the lock housing assembly;

aligning an optical transceiver on a second sidemember of the cover assembly with a corresponding optical transceiver on a second side of said housing body;

transmitting an optical signal from said optical transceiver on said first sidemember to said corresponding optical transceiver on said first side of said housing body;

receiving said optical signal within said corresponding optical transceiver on said first side of said housing body;
communicating said optical signal from said first side of said housing body to said second side of said housing body;
transmitting said optical signal from said corresponding optical transceiver on said second side of said housing body; and,
receiving said optical signal within said optical transceiver on the second sidemember of the cover assembly.

* * * * *